(12) United States Patent
Burch et al.

(10) Patent No.: US 12,475,138 B2
(45) Date of Patent: Nov. 18, 2025

(54) SYSTEMS AND METHODS FOR DATA MIGRATION

(71) Applicant: MongoDB, Inc., New York, NY (US)

(72) Inventors: Mark Burch, Kensington (AU); Tom Hollander, Eastwood (AU); David Hastwell, Baulkham Hills (AU); Poonam Meghnani, North Kellyville (AU); Andrew Walker, Bondi Junction (AU)

(73) Assignee: MongoDB, Inc., New York, NY (US)

( * ) Notice: Subject to any disclaimer, the term of this patent is extended or adjusted under 35 U.S.C. 154(b) by 0 days.

(21) Appl. No.: 18/664,935

(22) Filed: May 15, 2024

(65) Prior Publication Data
US 2024/0385998 A1 Nov. 21, 2024

Related U.S. Application Data

(60) Provisional application No. 63/502,602, filed on May 16, 2023.

(51) Int. Cl.
*G06F 16/25* (2019.01)
*G06F 16/21* (2019.01)
*G06F 16/242* (2019.01)

(52) U.S. Cl.
CPC .......... *G06F 16/258* (2019.01); *G06F 16/211* (2019.01); *G06F 16/214* (2019.01); *G06F 16/2423* (2019.01)

(58) Field of Classification Search
CPC .... G06F 16/258; G06F 16/211; G06F 16/214; G06F 16/2423
See application file for complete search history.

(56) References Cited

U.S. PATENT DOCUMENTS 8,996,463 B2   3/2015  Merriman et al.
11,372,828 B1  6/2022  Bendapudi
(Continued)

OTHER PUBLICATIONS

Hollander, Relational Migrator. Bring your relational workloads to MongoDB with confidence. YouTube. Jul. 18, 2022. MongoDB Relational Migrator: Bring Your Relational Workloads to MongoDB with Confidence. https://www.youtube.com/watch?v=QSq3bgRTKUs [Last Accessed Aug. 15, 2024] 6 Pages.

*Primary Examiner* — Tyler J Torgrimson
(74) *Attorney, Agent, or Firm* — Wolf, Greenfield & Sacks, P.C.

(57) ABSTRACT

Systems and methods described herein may improve data migration between databases that store data under different schemas. Such systems and methods may be used to transform data from a first schema (e.g., tabular, such as in relational databases) to second schema (e.g., document-based, such as in some non-relational databases). In some embodiments, data transformation for database migration may be performed using at least one rule (e.g., specified by a user) specifying a logical arrangement under the second schema for transforming a grouping of source data under the first schema. For example, tables under a tabular schema may be transformed into new documents and/or fields within documents under a document-based schema in a manner specified by the transform rule(s). In some embodiments, transforming source data in this manner permits organizing the migrated data efficiently to reduce computing resources needed to migrate the data between databases and/or for future data access operations.

20 Claims, 14 Drawing Sheets

(56) References Cited

U.S. PATENT DOCUMENTS

| | | |
|---|---|---|
| 11,403,317 B2 | 8/2022 | Horowitz et al. |
| 11,544,284 B2 | 1/2023 | Horowitz et al. |
| 12,159,050 B1 * | 12/2024 | Bekelman ............. G06F 3/0647 |
| 2014/0019410 A1 * | 1/2014 | Kemmler ................ G06F 16/25 |
| | | 707/610 |
| 2014/0032525 A1 | 1/2014 | Merriman et al. |
| 2014/0279838 A1 | 9/2014 | Tsirogiannis et al. |
| 2014/0344778 A1 | 11/2014 | Lau et al. |
| 2015/0370916 A1 * | 12/2015 | Bostick ................ G06F 16/214 |
| | | 707/809 |
| 2017/0262516 A1 | 9/2017 | Horowitz et al. |
| 2017/0262517 A1 | 9/2017 | Horowitz et al. |
| 2019/0155801 A1 | 5/2019 | Karunanithi et al. |
| 2021/0200744 A1 | 7/2021 | Gubba et al. |
| 2024/0061857 A1 | 2/2024 | Green et al. |
| 2024/0281416 A1 * | 8/2024 | Vasa .................... G06F 16/214 |

* cited by examiner

SYSTEMS AND METHODS FOR DATA MIGRATION

RELATED APPLICATIONS

This application claims the benefit under 35 U.S.C. § 119(e) of U.S. Provisional Application No. 63/502,602, filed May 16, 2023, and entitled "SYSTEMS AND METHODS FOR DATA MIGRATION," the contents which are incorporated herein by reference in their entirety.

NOTICE OF MATERIAL SUBJECT TO COPYRIGHT PROTECTION

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

There exist different ways of organizing data in a database, which are often referred to as "schemas." A common schema used in conventional database is a relational schema. A relational schema stores data in tables having rows and columns. Relational schemas may be strictly enforced due to the need for data to be rigidly structured in order for relational data operations to function on the relational dataset.

Other, more flexible schemas also exist for storing data, such as non-relational schemas. Non-relational schemas permit storage of data in formats other than tables. One example of a flexible schema is a document-based schema, in which data may be stored in documents within collections. Flexible schemas may be configured to function using data operations that do not require the data to be rigidly structured as in relational schemas.

SUMMARY

The present disclosure provides systems and methods that improve data migration between databases that store data under different schemas. For instance, such systems and methods may be used to transform data from a first schema (e.g., tabular, such as in relational databases) to second schema (e.g., document-based, such as in some non-relational databases). In some embodiments, data transformation for database migration may be performed using at least one rule (e.g., specified by a user) specifying a logical arrangement under the second schema for transforming a grouping of source data under the first schema. For example, tables under a tabular schema may be transformed into new documents and/or fields within documents under a document-based schema in a manner specified by the transform rule(s). In some embodiments, transforming source data in this manner permits organizing the migrated data efficiently to reduce computing resources needed to migrate the data between databases and/or for future data access operations.

The inventors recognized that conventional data migration schemes are inflexible and fail to take advantage of performance enhancements available when transforming data between different schemas. For instance, transforming data from a relational database to a non-relational database using a conventional migration scheme may simply entail converting all tabular data in the relational database to respective collections of documents in the non-relational database (e.g., with each row of each table becoming a new document). Such conventional approaches do not take into account any relationships that may exist between tables in the source database that would speed up the migration process as well as data access in subsequent data operations if preserved in the destination database.

To overcome the drawbacks of conventional data migration schemes, the inventors developed improved systems and methods for data migration between databases having different schemas. In some embodiments, such systems and methods operate responsive to a data migration request to migrate source data from a source database having a source schema to destination database having a destination schema. For example, the source schema may be tabular and the source database may be a relational database, and/or the destination schema may be document-based and the destination database may be a non-relational database. In some embodiments, the migration request may include at least one rule specifying a logical arrangement under the destination schema to which a grouping of source data under the source schema is to be transformed. For example, the transformation rule(s) may specify a logical arrangement of base-level data structures (e.g., documents in a non-relational database) to which base-level data structures of the source data (e.g., table rows in a relational database) are to be transformed. In some embodiments, the transformation may be carried out according to the transformation rule(s) to generate transformed source data stored in the destination database including the specified logical arrangement. By using at least one transformation rule(s) to specify a logical arrangement under the destination schema, systems and methods described herein provide enhanced flexibility to tailor the logical arrangement of data within the destination database in a manner that improves efficiency of the migration and/or efficiency of future data access requests targeting the destination database.

As one example illustrating the improvements provided by enhanced flexibility achieved herein, a database migration request may be received specifying that a base-level data structure (e.g., a row of a table) in the source data under the first schema is to be transformed to generate one or more new corresponding fields within an existing base-level data structure (e.g., a document) under the second schema within the destination database. For example, generating one or more new fields within an existing base-level data structure may be selected as an alternative to generating a new base-level data structure under the second schema, which may improve data access performance in future operations in some cases. For instance, the base-level data structure in the source data may have a linked relationship (e.g., primary key-foreign key relationship) with another base-level data structure in the source data that has a corresponding existing base-level data structure in the destination database. In this case, expanding the existing base-level data structure in the destination database, as opposed to creating a new base-level data structure, results in a pre-aggregated data structure, limiting or eliminating the need to traverse several base-level data structures to aggregate the resulting data in a future data access operation.

Similarly, in another example, a base-level data structure having different or no linked relationships to other base-level data structures may be advantageously transformed into a new base-level data structure in the destination database. Where no superfluous linked data is carried over to the corresponding base-level data structures of the destination database, the resulting data in the destination database may be made lightweight and faster to load during subsequent data access operations. And, in contrast to a conventional approach that might automatically transform base-level data structures in the source database to new base-level data structures in the destination database, this example provides the flexibility to generate new base-level data structures only where efficient and/or appropriate for the particular application.

In some embodiments, the transformation rule(s) for logical arrangement may be selected from among multiple options for logical arrangements, such as by a user in response to a prompt from a graphical user interface (GUI). For example, options for logical arrangements for transforming a particular base-level data structure in the source data may include a first option to generate a new base-level data structure under the destination database schema and/or a second option to generate one or more new fields within an existing base-level data structure under the destination database schema. In some embodiments, selection may be available between generating new fields within a base-level data structure and/or generating an array within a base-level data structure for further improvements to efficiency where appropriate.

In some embodiments, use of transformation rule(s) described herein may enhance the speed of data migration by identifying groupings (e.g., tables) of the source data that are linked to one another. For instance, at least some linked groupings (e.g., having primary key-foreign key relationships) may be identified and separated for parallel migration according to their interdependencies, resulting in more efficient data migration. Accordingly, flexibility provided by systems and methods described herein may speed up data migration and/or subsequent data access operations as compared to conventional approaches.

In some embodiments, a graph may be generated using the migration request to define an order and/or priority for loading portions of the source data from the first database. For example, the graph may include a dependency graph with multiple parallel paths indicating multiple portions of the source data for transforming and/or loading in parallel. The inventors recognized that, in addition to improving efficiency of future data access operations targeting the migrated data, transformation rules may be used to parallelize and improve the computational efficiency of the migration process itself. For example, transformation rules may indicate which groupings are to be transformed in parallel with other groupings and which groupings depend first on transformation of other (e.g., base) groupings. In some embodiments, tables in a relational database may be identified (e.g., in response to user specification in the migration request) as base collections to be created in a non-relational database, and relationships among the designated tables may be used to determine which other (e.g., secondary) tables may become collections linked to the base-level collections. In some embodiments, the migration request (e.g., the rule(s)) may indicate which portions of the source data are linked to other portions of the source data, such as which columns of tables are primary keys.

In some embodiments, a received migration request may further specify a first address where the source data in the first database is stored and/or a second address at which the transformed source data is to be stored in the second database. For example, the migration request may include all of the user-supplied information needed for the transformation and data transfer to be completed. According to various embodiments, the transformation may be performed, at least in part, synchronously, and/or at least in part, asynchronously.

In some embodiments, data migration techniques described herein may be configured to compensate for circular dependencies among source data in the source database. In some embodiments, techniques described herein may include identifying a first grouping and a second grouping of source data in the first portion of the first database wherein the first and second groups reference one another. For example, a first table of a relational source database may reference a second table of the relational source database, and the second table may further reference the first table. In some embodiments, such techniques may further include generating a third grouping of the transformed source data having base-level data structures corresponding to base-level data structures of the first grouping and generating a fourth grouping having base-level data structures corresponding to base-level data structures of the first and second groupings. For example, a first collection of documents in a non-relational database may be generated corresponding to rows of the first table and a second collection of documents in the non-relational database may be generated corresponding to rows of the second table and at least some rows of the first table. For instance, a circular dependency among the first and second tables may be resolved by adding documents to the second collection corresponding to rows of the first table where the second table in the relational source database relied on those rows of the first table.

In some embodiments, generating the fourth grouping may include generating a cache having base-level data structures corresponding to the base-level data structures of the first grouping and moving and/or copying at least some of the base-level data structures of the cache to the fourth grouping. For example, techniques described herein may include generating a cache with documents corresponding to rows of the first table that may be used to fill in documents of the second collection where the second table in the relational source database relied on those rows of the first table. Moreover, using a cache in this manner may permit each grouping of the source database to be processed only once despite circular dependencies among multiple groupings of the source database.

Still other aspects, examples, and advantages of these exemplary aspects and examples, are discussed in detail below. Moreover, it is to be understood that both the foregoing information and the following detailed description are merely illustrative examples of various aspects and examples and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example.

The appearances of such terms herein are not necessarily all referring to the same example.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments and are incorporated in and constitute a part of this specification but are not intended as a definition of the limits of the present disclosure. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

DETAILED DESCRIPTION

As described above, the present disclosure provides systems and methods that improve data migration between databases that store data under different schemas. For instance, such systems and methods may be used to transform data from a first schema (e.g., tabular, such as in relational databases) to second schema (e.g., document-based, such as in some non-relational databases). In some embodiments, data transformation for database migration may be performed using at least one rule (e.g., specified by a user) specifying a logical arrangement under the second schema for transforming a grouping of source data under the first schema. For example, tables under a tabular schema may be transformed into new documents and/or fields within documents under a document-based schema in a manner specified by the transform rule(s). In some embodiments, transforming source data in this manner permits organizing the migrated data efficiently to reduce computing resources needed to migrate the data between databases and/or for future data access operations.

Figure 1:
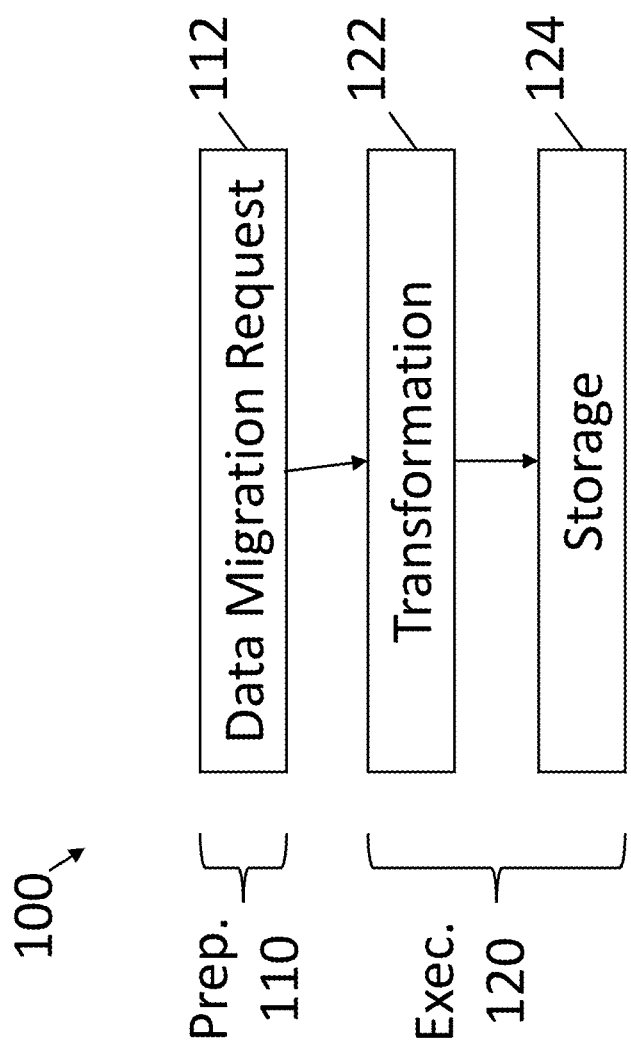
FIG. 1 illustrates an example process flow for migrating data between databases under different schemas, according to some embodiments.

FIG. 1 illustrates an example process flow 100 for migrating data between databases under different schemas, according to some embodiments. As shown in FIG. 1, process flow 100 may include preparation steps 110 and execution steps 120. For instance, in FIG. 1, preparation steps 110 include step 112 of processing a data migration request and execution steps 120 include step 122 of logical arrangement transformation and step 124 of storing data under the transformed logical arrangement.

In some embodiments, systems and methods described herein operate responsive to a data migration request to migrate source data from a source database having a source schema to destination database having a destination schema. For example, as shown in FIG. 1, step 112 of processing a data migration request may be performed responsive to receiving the data migration request. In some embodiments, a data migration request may be received via a graphical user interface (GUI) presented within a data migration application. For instance, the data migration application may be executed locally at a user's computing system, and the request may be to migrate the user's data from a database associated with the user's computing system (and/or from a remote and/or distributed database, e.g., identified in the data migration request) to a target database identified in the data migration request.

In some embodiments, the data migration request may identify a source schema of the source data to be migrated and/or a destination schema of the destination database. For example, the source schema may be tabular and the source database may be a relational database, and/or the destination schema may be document-based and the destination database may be a non-relational database. For instance, where the source schema is tabular, the source schema may be identified in the request as an indication of whether the source database uses Oracle, MySQL, Microsoft SQL Server, PostgreSQL, and/or another relational database provider. In some cases, the destination schema may be preconfigured, such as where the process flow is adapted for use with a particular destination schema such as a document-based or other unstructured schema.

In some embodiments, a data migration request processed at step 122 may further specify a first address where the source data in the first database is stored and/or a second address at which the transformed source data is to be stored in the second database. For example, the migration request may include all of the user-supplied information needed for the transformation and data transfer to be completed.

Figure 2:
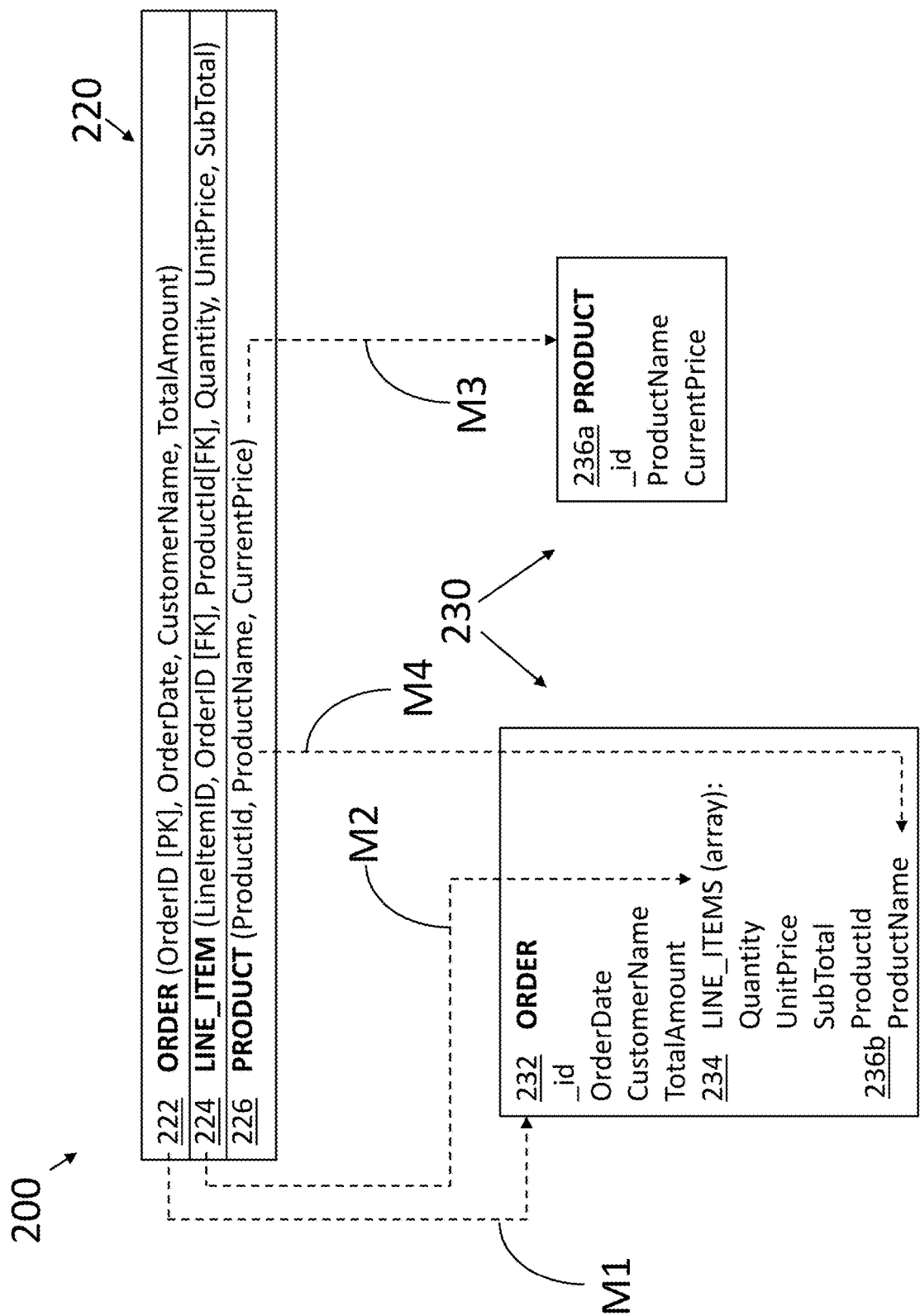
FIG. 2 illustrates an example mapping from groupings of base-level data structures in a first database under a first schema to groupings of base-level data structures in a second database under a second schema, according to some embodiments.

In some embodiments, a data migration request processed at step 122 may include at least one rule specifying a logical arrangement under the destination schema to which a grouping of source data under the source schema is to be transformed. For example, the transformation rule(s) may specify a logical arrangement of base-level data structures (e.g., documents in a non-relational database) to which base-level data structures of the source data (e.g., table rows in a relational database) are to be transformed. For instance, the data migration request may specify a mapping of tables in relational source data to collections of documents in a document-based destination database. One example mapping of source data under a source schema to destination data under a destination schema is shown in FIG. 2 and described further below.

In some embodiments, transformation rules for logical arrangement under the destination schema specified in the data migration request may be selected from among multiple options for logical arrangements. For example, options for logical arrangements may be selected a user in response to a prompt from a GUI, such as with an option selected for each grouping of base-level data structures to be migrated from the source database to the destination database. For instance, options for logical arrangements for transforming a particular base-level data structure in the source data may include a first option to generate a new base-level data structure under the destination database schema and/or a second option to generate one or more new fields within an existing base-level data structure under the destination database schema. In some embodiments, selection may be available between generating new fields within a base-level data structure and/or generating an array within a base-level data structure for further improvements to efficiency where appropriate. Further examples of how these options may result in differences in how the destination data is stored are described further below.

In some embodiments, the migration request (e.g., transformation rule(s)) may indicate which portions of the source data are linked to other portions of the source data. For example, where the source data is tabular, the data migration request may further indicate (e.g., based on user input provided via the GUI) which columns of tables are primary keys.

In some embodiments, step 122 of logical arrangement transformation may include transforming source data under the source schema to generate transformed source data including a logical arrangement under the destination schema. For example, the logical arrangement may be specified in the data migration request processed at step 112.

Figure 5:
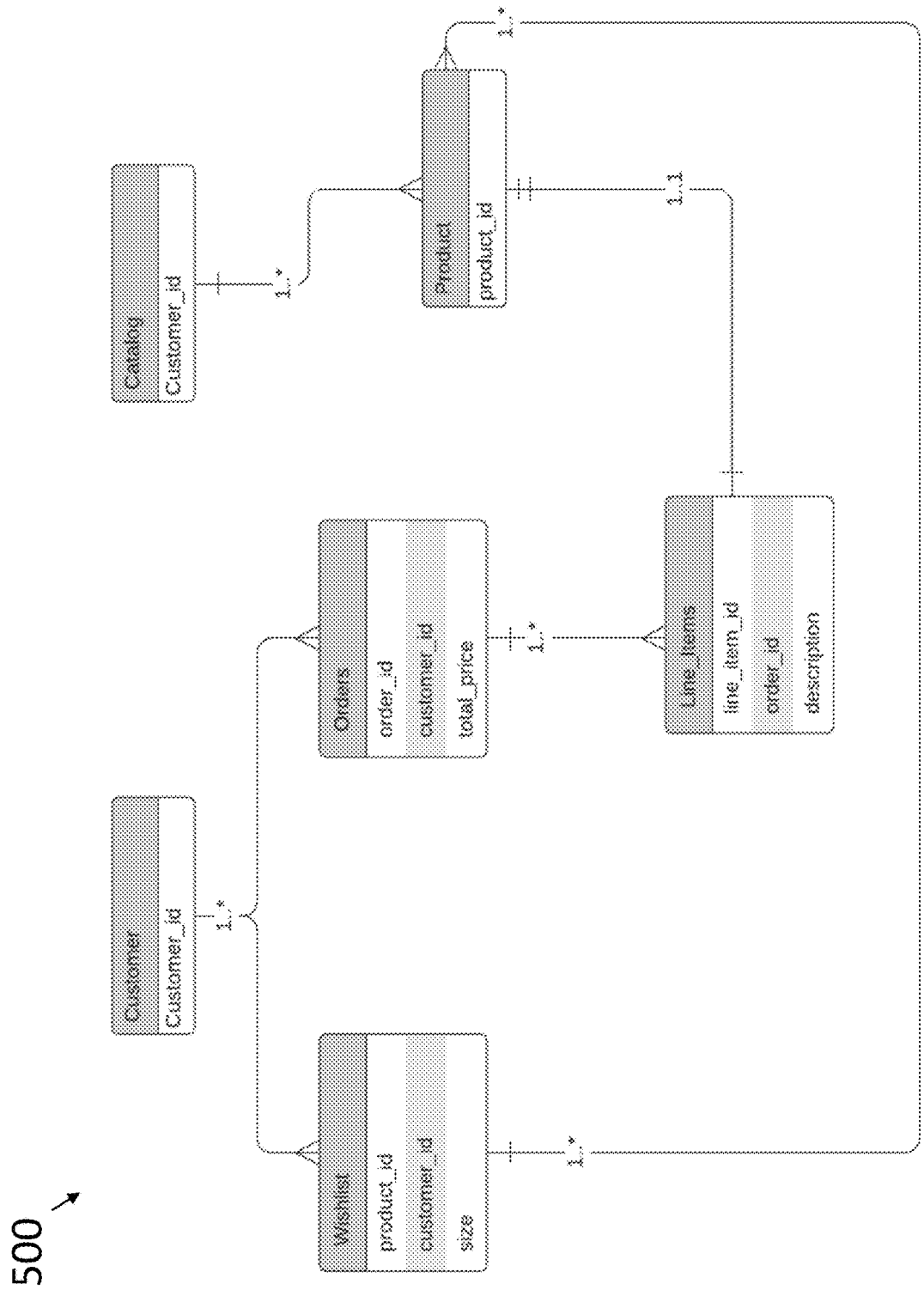
FIG. 5 illustrates an example of a directed and weighted graph of groupings of base-level data structures, according to some embodiments.

In some embodiments, step 122 of logical arrangement transformation may further include traversing a graph generated using the data migration request that defines an order and/or priority for migrating groupings of the source data to the destination database. For example, as part of preparation steps 110, a step of generating a graph may be performed using the data migration request. In some embodiments, the graph may include a dependency graph with multiple parallel paths indicating multiple portions of the source data for transforming and/or loading in parallel. One example of a directed and weighted graph that may be generated as part of preparation steps 110 and/or traversed as part of transformation step 122 is shown in FIG. 5 and described further below. In some embodiments, dependencies in the graph may be based on indications (e.g., from the data migration request) as to which portions of the source data are linked to other portions of the source data. For example, where the source data is tabular, indications of which columns of tables are primary keys may be used to determine dependencies to be included in the graph.

In some embodiments, traversing a graph within step 122 of logical arrangement transformation may include transforming groupings of base-level data structures in the source data in parallel according to the transformation rule(s). For example, the graph may indicate which groupings depend first on transformation of other (e.g., base) groupings. For instance, groupings of base-level data structures may be identified (e.g., in response to user specification in the migration request) as base groupings, and relationships among the identified tables may be used to determine which other (e.g., secondary) groupings may become groupings linked to the base groupings. In the case of a relational source database and a document-based destination database, tables in the relational source database may be identified as base tables for which base collections may be created in the document-based destination database, and relationships among the designated tables may be used to determine which secondary tables may be come collections linked to the base collections.

In some embodiments, step 124 of storing the transformed source data in the destination database may include storing the data having the logical arrangement specified in the data migration request. In some embodiments, transformation at step 122 may be performed at least partially synchronously and/or asynchronously with storage at step 124, depending on the embodiment.

FIG. 2 illustrates an example mapping 200 from groupings 220 of base-level data structures in a first database under a first schema to groupings 230 of base-level data structures in a second database under a second schema, according to some embodiments.

As shown in FIG. 2, source groupings 220 include a first grouping 222 entitled ORDER, a second grouping 224 entitled LINE_ITEM, and a third grouping 226 entitled PRODUCT. First grouping 222 ORDER is shown including the fields of OrderID, OrderDate, CustomerName, and TotalAmount. Second grouping 224 LINE_ITEM is shown including the fields of LineItemID, OrderID, ProductId, Quantity, UnitPrice, and SubTotal. Third grouping 226 PRODUCT is shown including the fields of ProductId, ProductName, and CurrentPrice. For instance, data structures within each grouping may store data in the illustrated fields for given entries. In some embodiments, source groupings 220 may correspond to tables under a tabular schema in a relational database. For instance, OrderID may be a primary key (PK) for first grouping 222 as an ORDER table and as a foreign key (FK) for grouping 224 as a LINE_ITEM table, and ProductId may be a foreign key for second grouping 224 as a LINE_ITEM table linking to third grouping 226 as a PRODUCT table.

Also shown in FIG. 2, destination groupings 230 include a first grouping 232 entitled ORDER and a second grouping 236 entitled PRODUCT. In some embodiments, groupings 232 and 236*a* may correspond to collections of documents under a document-based schema in a document-based database.

In some embodiments, a data migration request (e.g., processed at step 122 in FIG. 1) may include rules specifying a logical arrangement under the destination schema to which groupings 220 are to be transformed to result in groupings 230. For example, the transformation rule(s) may specify a logical arrangement of base-level data structures (e.g., documents) in groupings 230 to which base-level data structures of groupings 220 (e.g., table rows) are to be transformed. For instance, the data migration request may specify a mapping of ORDER, LINE_ITEM, and PRODUCT tables to ORDER and PRODUCT collections of documents in a document-based destination database.

In some embodiments, transformation rules for logical arrangement under the destination schema specified in the data migration request may be selected from among multiple options for logical arrangements. For example, options for logical arrangements for transforming a given base-level data structure in groupings 220 may include a first option to generate a new base-level data structure in groupings 230 and/or a second option to generate one or more new fields within an existing base-level data structure in groupings 230. For instance, new fields may be generated within a base-level data structure and/or an array may be generated an array within a base-level data structure.

An example of the first option to generate a new base-level data structure is shown in FIG. 2 for grouping 222 ORDER. For example, as shown in FIG. 2, a first mapping M1 creates new base-level data structures in grouping 232 ORDER for base-level data structures of grouping 222 ORDER. For instance, grouping 222 may be an ORDER table and grouping 232 may be a collection having documents corresponding to rows of the ORDER table, such as with each document having the illustrated _id field corresponding to the OrderID primary key of grouping 222 and further having fields corresponding to the other fields illustrated fields of the ORDER grouping 222. For instance, the documents of grouping 232 may be new base-level data structures corresponding to the rows as base-level data structures of grouping 222.

An example of the second option to generate new fields within an existing base-level data structure are shown in FIG. 2 for grouping 224 LINE_ITEM. For example, as shown in FIG. 2, a second mapping M2 creates an array 234 entitled LINE_ITEMS in grouping 232 ORDER for base-level data structures of grouping 224 LINE_ITEM. For instance, in groupings 220, grouping 224 LINE_ITEM may hold additional fields corresponding to base-level data structures in grouping 222 ORDER, and thus a user may choose an option to create array 234 of new fields in grouping 232 ORDER for base-level data structures in grouping 232 ORDER. In the case of groupings 220 as tables, grouping 222 may be an ORDER table that is typically joined with grouping 224 LINE_ITEM to access data in additional fields associated with rows in the ORDER table, which may make grouping 224 suitable for transformation to a single ORDER collection having an array of fields for each document in the ORDER collection. For instance, when stored in a single collection, the destination data may be stored as though it were already joined in the source data for more efficient access in the destination database.

Another example of the first option to generate a new base-level data structure is shown in FIG. 2 for grouping 226 PRODUCT. For example, as shown in FIG. 2, a third mapping M3 creates base-level data structures in a new grouping 236a corresponding to base-level data structures in grouping 226 PRODUCT. For instance, grouping 236a may be a PRODUCT collection having documents corresponding to rows of the PRODUCT table, such as with each document having the illustrated _id field corresponding to the ProductId field.

Another example of the second option to generate fields within existing base-level data structures is further shown in FIG. 2 for grouping 226 PRODUCT. For example, as shown in FIG. 2, a fourth mapping M4 adds fields 236b ProductId and ProductName to each LINE_ITEMS array 234 in grouping 232 ORDER. For instance, in groupings 220, grouping 226 PRODUCT may hold additional fields corresponding to base-level data structures in grouping 224 LINE_ITEM as described above for grouping 224 LINE_ITEM with respect to grouping 222 TABLE. In this case, a user may choose an option to add fields 236b to LINE_ITEMS array 234 within grouping 232 corresponding to ProductId and ProductName as may be typically joined with grouping LINE_ITEM 224 (e.g., in a tabular schema) while leaving out field CurrentPrice as may not typically be joined to grouping 224 LINE_ITEM.

In some embodiments, transformation rules may be used to enhance migration to the destination schema by storing source data in a manner that makes data access operations on the migrated data more efficient. For example, generating array 234 and/or fields 236b base-level data structures of grouping 232 ORDER may be selected as an alternative to generating new base-level data structures (e.g., in a new collection) in groupings 230, which may improve data access performance in future operations in some cases. For instance, linked relationships among base-level data structures in the source data, such as base-level data structures of grouping 222 ORDER and of grouping 224 LINE_ITEM that may be joinable in the source database, may be migrated into a corresponding linked relationship in the destination database, such as grouping 232 which includes base-level data structures further having fields in of the array 234 LINE_ITEMS. In the case of grouping 222 ORDER and grouping 224 LINE_ITEM, expanding grouping 232 ORDER to include fields of grouping 224 LINE_ITEM in the destination database, as opposed to creating a new grouping with base-level data structures of grouping 224 LINE_ITEM (e.g., as for grouping 236a PRODUCT), results in a pre-aggregated grouping of base-level data structures corresponding to grouping 222 ORDER and grouping 224 LINE_ITEM, limiting or eliminating the need to traverse multiple groupings of base-level data structures to aggregate the resulting data in a future data access operation.

Similarly, as another example, a base-level data structure having different or no linked relationships to other base-level data structures may be advantageously transformed into a new base-level data structure in the destination database. For instance, in FIG. 2, grouping 236a PRODUCT is shown as a separate grouping from grouping 232 ORDER having additional base-level data structures. Where no superfluous linked data is carried over to the corresponding base-level data structures of the destination database, such as base-level data structures having the CurrentPrice field in grouping 236a PRODUCT in FIG. 2, the resulting data in the destination database may be made lightweight and faster to load during subsequent data access operations. And, in contrast to a conventional approach that might automatically transform base-level data structures in the source database to new base-level data structures in the destination database, new base-level data structures may be selectively generated where efficient and/or appropriate for the particular application.

In some embodiments, use of transformation rule(s) described herein may enhance the speed of data migration by identifying groupings (e.g., tables) of the source data that are linked to one another. For instance, at least some linked groupings (e.g., having primary key-foreign key relationships) may be identified and separated for parallel migration according to their interdependencies, resulting in more efficient data migration. Accordingly, flexibility provided by systems and methods described herein may speed up data migration and/or subsequent data access operations as compared to conventional approaches.

In some embodiments, transformation rules for transforming groupings 220 to groupings 230 may indicate, within a data migration request, which of groupings 220 are linked to one another. For example, where the source data shown in FIG. 2 is tabular, the data migration request may indicate (e.g., based on user input provided via the GUI) that the OrderID column is a primary key in grouping 222 ORDER and/or a foreign key in grouping 224 LINE_ITEM, as may be the case for ProductId in grouping 224 LINE_ITEM and grouping 226 PRODUCT.

Figure 3:
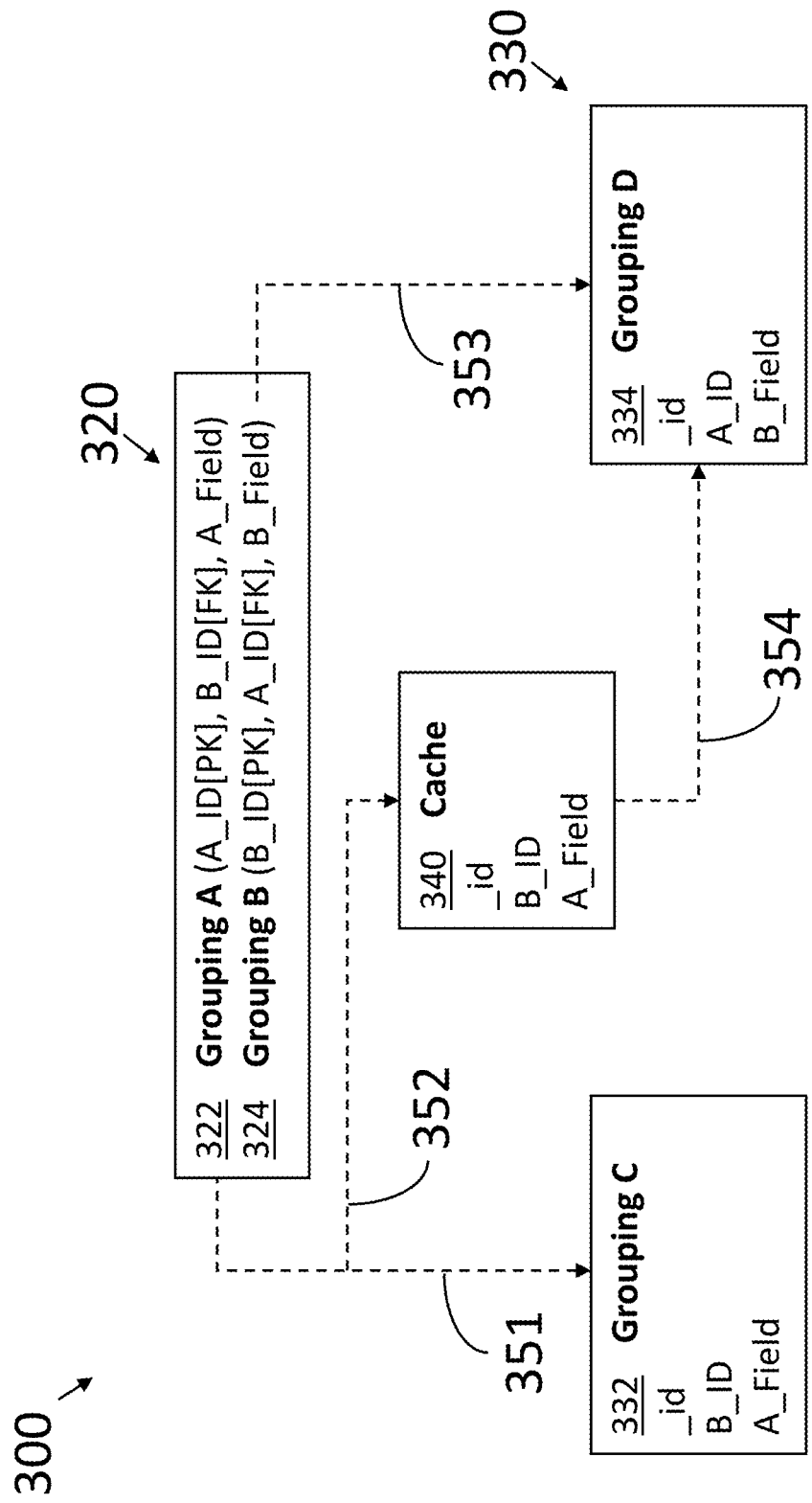
FIG. 3 illustrates an example process for addressing circular dependencies among groupings of base-level data structures under a first schema for migration to groupings of base-level data structures under a second schema, according to some embodiments.

FIG. 3 illustrates an example process 300 for addressing circular dependencies among groupings 320 of base-level data structures under a first schema for migration to groupings 330 of base-level data structures under a second schema, according to some embodiments.

As shown in FIG. 3, source groupings 230 include a first grouping A 322 having fields A_ID, B_ID, and A_Field and a second grouping B 324 having fields B_ID, A_ID, and B_FIELD. For example, base-level data structures within each grouping may store data in the illustrated fields for given entries. For instance, groupings 322 and 324 may correspond to tables under a tabular schema in a relational database, with field A_ID as a primary key for grouping 322 and as a foreign key for grouping 324, and field B_ID may be a foreign key for grouping 322 and a primary key for grouping 324.

In some embodiments, data migration techniques described herein may be configured to compensate for circular dependencies among source data in a source database, such as by identifying a first grouping and a second grouping of source data in the first portion of the first database that reference one another. For example, in FIG. 3, first grouping 322 references second grouping 324 via B_ID and second grouping 324 references first grouping 322 via A_ID.

Some embodiments may generate groupings of transformed source data having base-level data structures corresponding to base-level data structures of groupings of source data that reference one another. For example, as shown in FIG. 3, groupings 330 under the destination schema include a third grouping C 332, which may have base-level data structures corresponding to base-level data structures of first grouping A 322, and a fourth grouping D 334, which may have base-level data structures corresponding to base-level data structures of second grouping B 324. For instance, third grouping C 332 may be a collection of documents corresponding to rows of first grouping A 322 as a first table, and fourth grouping D 334 may be a collection of documents corresponding to rows of second grouping A 324 and at least some rows of first grouping A 322. As shown in FIG. 3, at 351, third grouping C 332 may be generated by transforming base-level data structures from first grouping A 322 into base-level data structures of third grouping C 332. For instance, in FIG. 3, third grouping C 332 may be a collection of documents having _id fields corresponding to the A_ID field and further having B_ID and A_Field fields. Similarly, in FIG. 3, fourth grouping D 334 may be generated by transforming base-level data structures from second grouping B 324 into base-level data structures of fourth grouping D 334, such as into documents having the _id field corresponding to the B_ID field.

In some embodiments, circular dependency among first grouping A 322 and second grouping B 324 may be resolved by adding base-level data structures to fourth grouping D 334 corresponding to base-level data structures of first grouping A 322 where second grouping B 324 relied on those base-level data structures of first grouping A 322.

For example, in FIG. 3 at 352, a part of generating fourth grouping D 334 may include generating a cache 340 having base-level data structures corresponding to the base-level data structures of first grouping A 322. For instance, cache 340 may hold the same base-level data structures as first grouping A 322 for use in generating fourth grouping D 334. Also shown in FIG. 3 at 354, a part of generating fourth grouping D 334 may include moving and/or copying at least some of the base-level data structures of cache 340 to fourth grouping D 334. For example, cache 340 may have documents corresponding to rows of first grouping A 322 that may be used to fill in documents of fourth grouping D 334 where second grouping B 324 relied on those rows of first grouping A 332, such as by adding each base-level data structure from cache 340 to second grouping B 324 for which second grouping B 324 does not already have a corresponding base-level data structure from 353. In some embodiments, using a cache in this manner may permit first grouping A 322 to be processed only once despite circular dependencies between first grouping A 322 and second grouping 324 B. In some embodiments, cache 340 may be held temporarily and may be deleted after second grouping B 324 is supplemented with any base-level data structures.

Overview of Further Detailed Examples

A Migrator Sync Engine as described herein may be configured to transform data during migration, using the mapping definitions generated based on input received via a GUI (e.g., presented to a user).

Motivation for Example

When data is moved from a relational database to MongoDB, it is beneficial for the data to be reshaped to align with MongoDB schema modelling patterns. This ensures that queries are efficient, application code is kept simple and performance and scalability are maximized. The Mapping & Modelling project will allow an architect to define how the schema should be transformed in the GUI; this project is all about using these mapping definitions during the migration process.

In some embodiments, data from any customer's relational source database can be reliably migrated to a destination (e.g., MongoDB) database. Some cases may support one-off, snapshot based replication and transformation of data. Some cases may migrate data from Oracle, SQL Server or MySQL.

Goals of Further Detailed Examples

In some embodiments, the Migrator Sync Engine is able to read the mapping information from a Migrator project file (as generated by the Migrator GUI), and use this to transform data during migration (driven through the APIs already built for One Time Replication).

In some embodiments, the mapping rules supported initially match those implemented in the GUI for Mapping & Modelling.

As a first mapping rule, "New Documents," rows from a specified table are inserted into a specified (e.g., new or existing) collection as new documents.

As a second mapping rule, "Array in Parent Documents" or "Embedded Array," given a row in a specified table, a parent MongoDB document is identified in a specified collection by looking up the row's foreign key field. The row is added as an element to an array in a specified location in the parent document.

As a third mapping rule, "Fields in Child Documents" or "Embedded Document," given a row in a specified table, child MongoDB documents are identified by traversing a foreign key and finding the IDs of rows in a child table, and then finding the corresponding MongoDB documents or array elements in a specified collection. The row is added as fields in each of the identified documents, in a specified path.

In some embodiments, when each row is migrated using any of the above mechanisms, columns are converted to fields based on the specification in the mapping.

In some embodiments, columns may be included or excluded from migration. For example, if primary or foreign key fields that are used for future operations are excluded, they may be migrated temporarily and then removed before and/or once synchronization is complete. Fields may be generated with the specified name (may differ from column name). Fields may be generated with the specified MongoDB data type. If the field is specified with a MongoDB type, the backend will attempt to convert the field to that exact type. If the field is specified with the "auto" type, the backend will determine the appropriate type.

In some embodiments, when documents are inserted (for "New Documents" mappings) or located (for other mappings), the _id field will be derived based on a project-level mapping option. For example, new ObjectIDs may be generated, all primary key fields may be wrapped in a document, and a single primary key field may be used. In some embodiments, if any tables have composite keys, just those tables will fall back to use the "wrapped primary keys" strategy.

In some embodiments, if multiple tables are determined to have a circular dependency (e.g., a first table references a column of a second table and the second table references a column of the first table), the circular dependency may be by populating a first collection (e.g., new or existing) with documents corresponding to rows of the first table, creating a temporary cache collection is created with documents corresponding to rows of the first table, and populating a second collection (e.g., new or existing) with documents corresponding to rows of the second table. For any rows of the first table that do not have corresponding documents in the second collection, the corresponding documents are moved from the temporary cache collection to the second collection, and the temporary cache collection is removed.

Example Mapping Process

Below is an example mapping process that may correspond to the mapping shown in FIG. 2 and described further above.

In some embodiments, a source relational database may have the following tables:

ORDER (OrderID [PK], OrderDate, CustomerName, TotalAmount)
LINE_ITEM (LineItemId, OrderId [FK], ProductId[FK], Quantity, UnitPrice, SubTotal)
PRODUCT (ProductId, ProductName, CurrentPrice)

In some embodiments, a migration request may provide the following mapping definitions ("M1" to "M4" are identifiers used for references) as rules for a logical arrangement in the destination database:

```
ORDER table
    M1: "New documents"
        To order collection
        Fields: OrderDate, CustomerName, TotalAmount
LINE_ITEM table
    M2: "Array in parent documents"
        To mapping M1 (order collection)
        Array path LineItems
        Fields: Quantity, UnitPrice, SubTotal
PRODUCT table
    M3: "New documents"
        To product collection
        All fields
    M4: "Fields in child documents"
        To mapping M2 (order collection, lineItems path)
        Document path: Root,
        Fields: ProductId, ProductName
```

The following collections of documents may be created in the destination database by the Sync component:

```
order collection:
    _id
    OrderDate
    CustomerName
    TotalAmount
    LineItems (array)
        Quantity
        UnitPrice
        SubTotal
        ProductId
        ProductName
Product collection:
    _id
    ProductName
    CurrentPrice
```

Optional Implementation Examples

In some embodiments, a single table row may be represented with fields at different levels of nesting in a document (e.g., using dotted paths for individual fields). In some embodiments, the order or number of elements included in embedded arrays may be controlled by user input. Alternatively, all linked rows may be added into arrays and the order will be non-deterministic. In some embodiments, the contents of fields may be manipulated in any way beyond simple type conversions (e.g. calculations, string concatenations, constant values, etc).

Example Transformation Engine

Figure 4A:
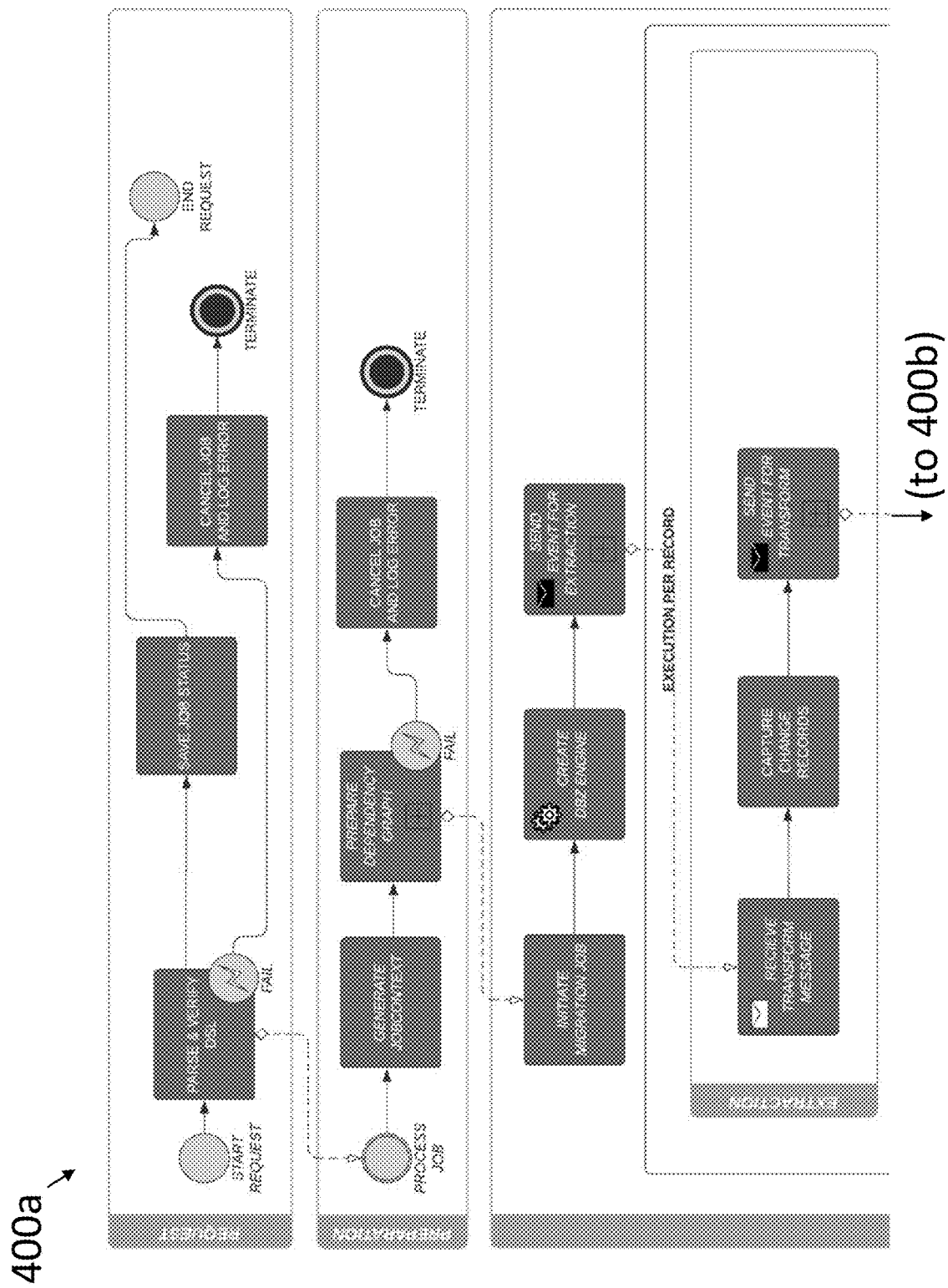
FIG. 4A illustrates a first portion of an example process flow for performing data migration, according to some embodiments.
Figure 4B:
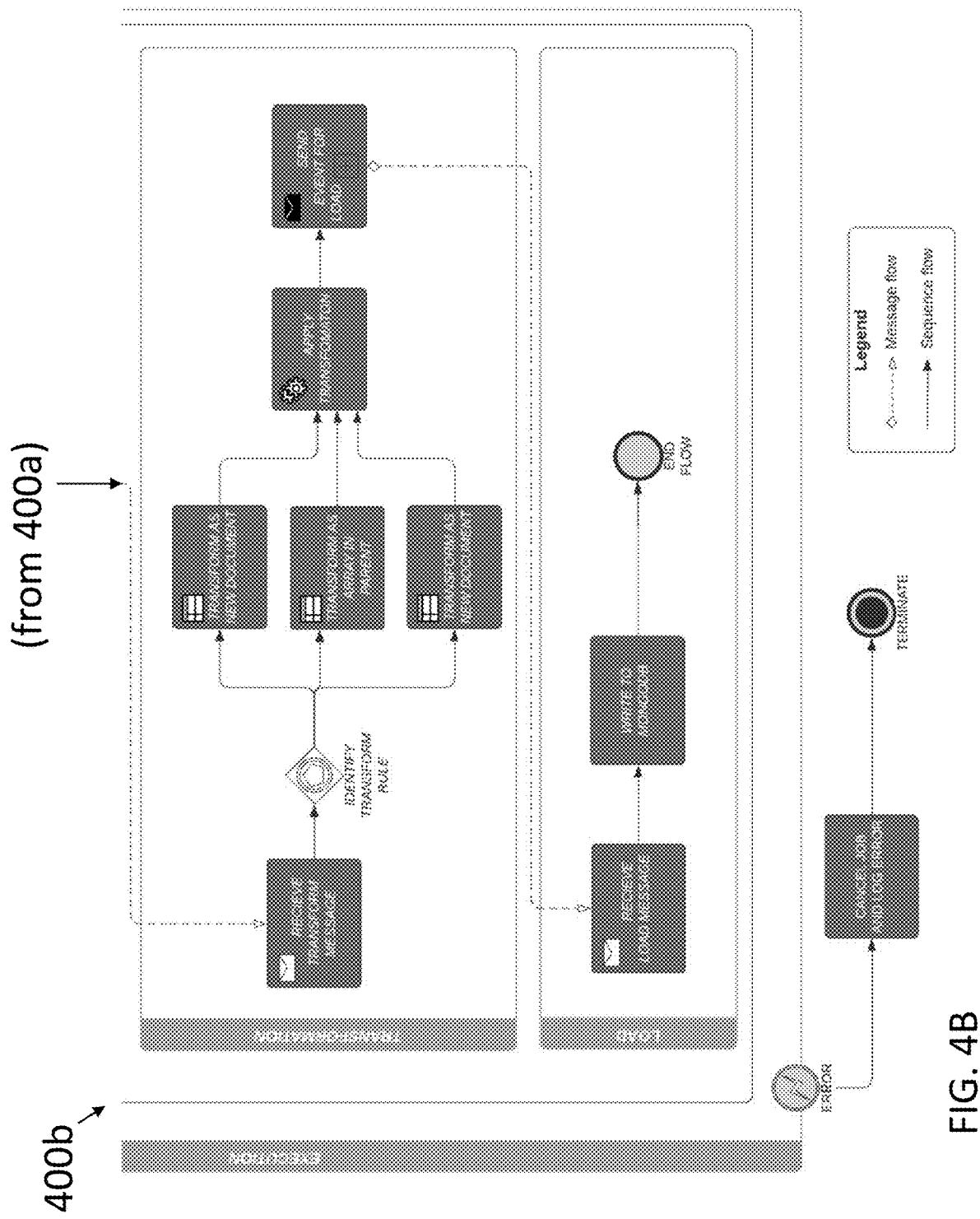
FIG. 4B illustrates a second portion of the process flow of FIG. 4A, according to some embodiments.

FIG. 4A illustrates a first portion 400a of an example process flow for performing data migration, according to some embodiments. FIG. 4B illustrates a second portion 400b of the process flow of FIG. 4A, according to some embodiments. The example process flow of FIGS. 4A-4B includes request, preparation, and execution sections, and the execution section includes extraction, transformation, and loading layers. In some embodiments, the process flow in FIGS. 4A-4B may be performed as described herein including in connection with FIG. 1.

In some embodiments, a migrator transformation engine may be part of the migration transformation layer. In some embodiments, the migrator transformation engine may be configured to facilitate the migration by processing the records as per instructions received in the form of migration DSL. In some embodiments, the migrator transformation engine may be configured to determine the order in which tables will be processed.

In some embodiments, the migrator transformation engine may be configured to apply table mapping rules, such as to create, for a given grouping of base-level data structures (e.g., table rows), new documents, an array in parent documents, and/or fields in child documents. In some embodiments, the migrator transformation engine may be configured to apply column renaming and data type mapping rules. In some embodiments, the migrator transformation engine may be configured to derive primary keys as per key strategy mentioned in migration DSL or generate objectID in absence of primary key.

In this example, the transformation may include Transform Rules defining the rules for extraction, transformation and loading data from source to target database, and Transform Engine applying the transformation rules on the source records.

Example of Using DSL to Load JobContext

The migrator job descriptor in the request payload defines the purpose of the job. It indicates the tables to migrate and how they should be migrated. When the job is received, the job context is formed before the execution is started. The job context may be configured to encapsulate and facilitate the selected source tables to be migrated, the selected columns/constraints to be migrated for each source table, and target collection mappings rules such as new document, array in parent, and field in child document. The job context may be further configured to encapsulate and facilitate target field name and data type mapping and a directed graph to define the order of reading source data records.

Example Load Order

In some embodiments, load order may define the priority for loading tables. When the JobContext is formed, a directed and weighted graph is generated considering the target mappings and their relationships from DSL.

FIG. 5 illustrates an example of a directed and weighted graph 500 of groupings of base-level data structures, according to some embodiments.

In some embodiments, the weight, indicating the load order, should ensure that the tables are read from the source in the same order as it must be written in the target database. In an event of conflict (ex. PRODUCT mapping having relations with WISHLIST, CATALOG, LINE ITEMS mappings in the graph below), the entire graph should be first loaded as per mapping relations. Then, in order to remove redundant mappings (ex MAPPING_PRODUCT), the graph should be traversed to compare the weight of duplicate nodes and remove all (red ones) except the one with max value of weight. This step is to ensure that each source record is read exactly once. As the result, Debezium source table include property for this example should be:

Example Algorithm—Iterative Approach

Figure 6:
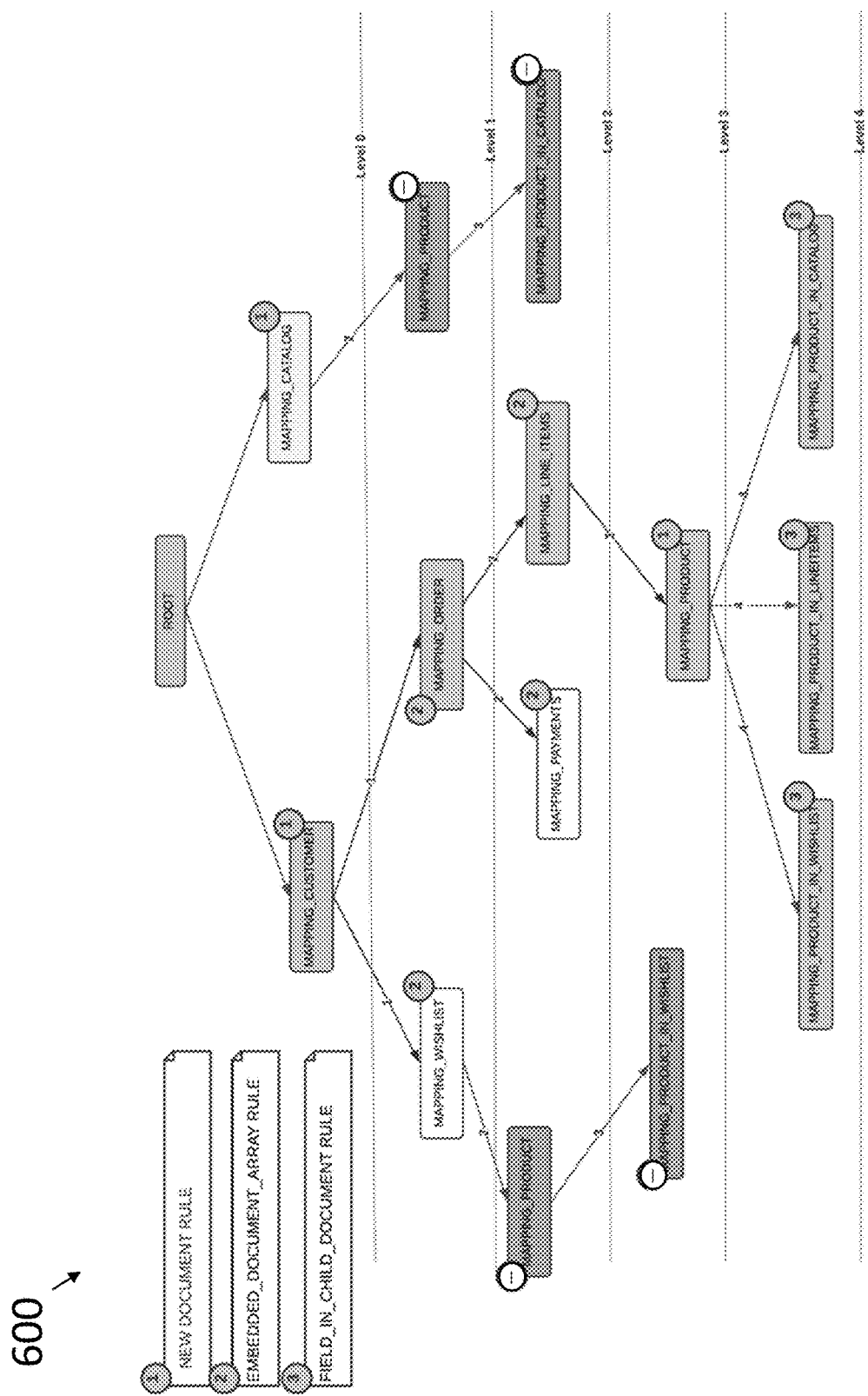
FIG. 6 illustrates an example map of source table names and associated mapping values, according to some embodiments.

FIG. 6 illustrates an example map 600 of source table names and associated mapping values, according to some embodiments.

An example algorithm is provided below for generating the illustrated mappings.

GIVEN: Map (mappingPerTable) of source table names as key and list of mappings having as values
EXPECTED RESULT: List of source tables enumerated in the order respecting transformation rules.
ALGORITHM:
STEP 1: Iterate over the map (mappingPerTable) entryset. For each entry iterate over the list of mapping. For each mapping, find the parent mapping (if any) and add to the mapping list
STEP 2: Iterate over the map (mappingPerTable) and find the entries with list of mapping having size equal to 1.
STEP 3: Filter out the selected mapping based on the rule with the highest precedence.
STEP 4: Add source table name (key) from filtered entries to final source table list/
STEP 5: Remove mappings from remaining list of mappings in the map (if exists) that share the same source table name as visited mapping.
STEP 6: Repeat Step 2 until all mappings are visited.

Example of Data Capture from Source

In some embodiments, JobContext maintains the graph of source tables to be captured in the order of priority defined in Step 2.

Single Task Mode Option

In some embodiments, the debezium connector properties table.include.list will be populated with the list of "schemaName.tableName" by breadth first traversal on the table dependency graph from root to leaf nodes respecting the load order.

Parallel Task Mode Option

Figure 7:
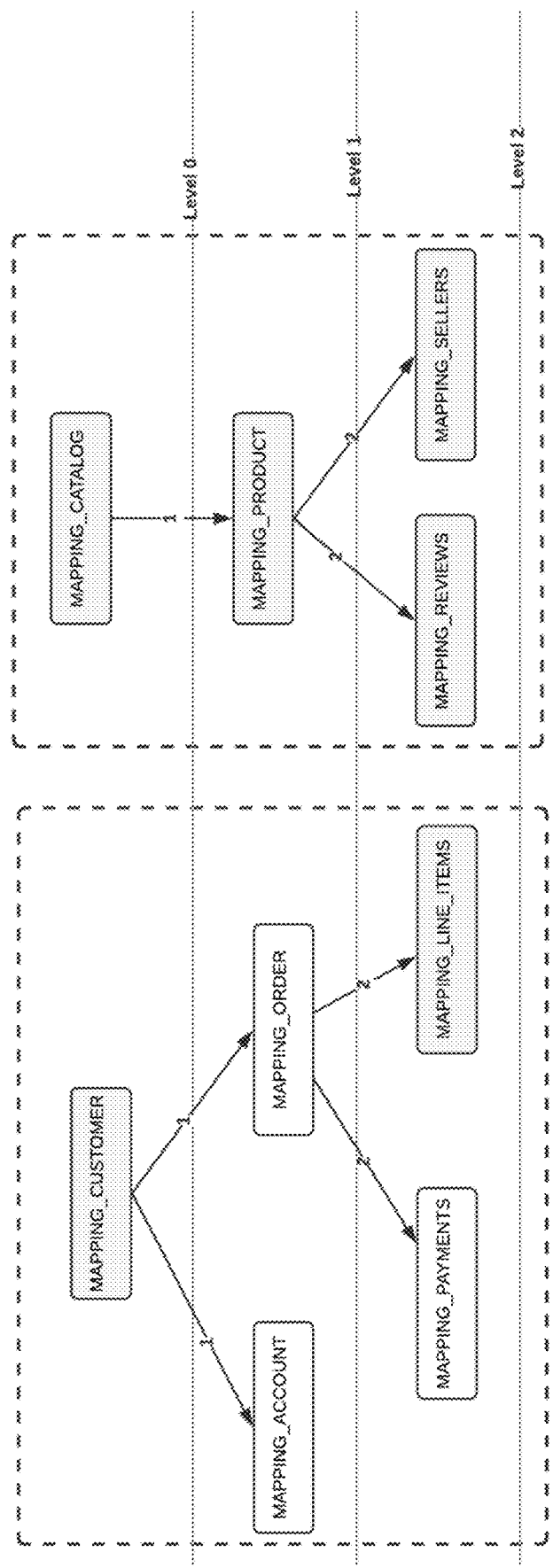
FIG. 7 illustrates a level sorted version of a table dependency graph corresponding to the map of FIG. 6, according to some embodiments.

FIG. 7 illustrates a level sorted version 700 of a table dependency graph corresponding to the map of FIG. 6, according to some embodiments.

In some embodiments, breadth first traversal can be done on the table dependency graph, running one level at a time and parallelizing transform execution for distinct nodes on the same level or island nodes. Once the transform is completed for all the nodes on the same level, a completion callback needs to notify the level completion which indicates the readiness for next level traversal.

Example Transformation Layer

Returning to FIG. 4B, in some embodiments, the transformation layer is where the transformation rules are applied on each record read from the source. Transformation can be broken down into a chain of events, each having distinct responsibility/task to perform on the record undergoing transformation. For example, a first event may be to identify

--- table.include.list: "Customer,Catalog,Wishlist,Orders,Payments,Line_items,Product"

and validate the table and column rule applicable on the record. A second event could be to apply a table rule to create new document/embedded document/reference to another document. A third event could be to transform the column to BSON fields based on target mapping rule for each column of the source table. A fourth event could be to send the transformed record to MongoDB sink consumer to persist in MongoDB.

Example Implementation

Example Request

In some embodiments, the controller layer receives the request to start the job with a request payload having configuration details (source and target DB urls) and job details. The request is validated and delegated to the job preparation layer. Once delegated, job status is marked as RUNNING and persisted.

Example Preparation

In some embodiments, a Context is a collection of data, often stored in a properties list or map or in a custom class which acts as a struct with accessors and modifiers. In some embodiments, the job context creation can be delegated to JobContextObjectFactory having create and refresh operations. The jobContext is created by triggering the prepareJob event and is passed on the next layer.

Figure 8:
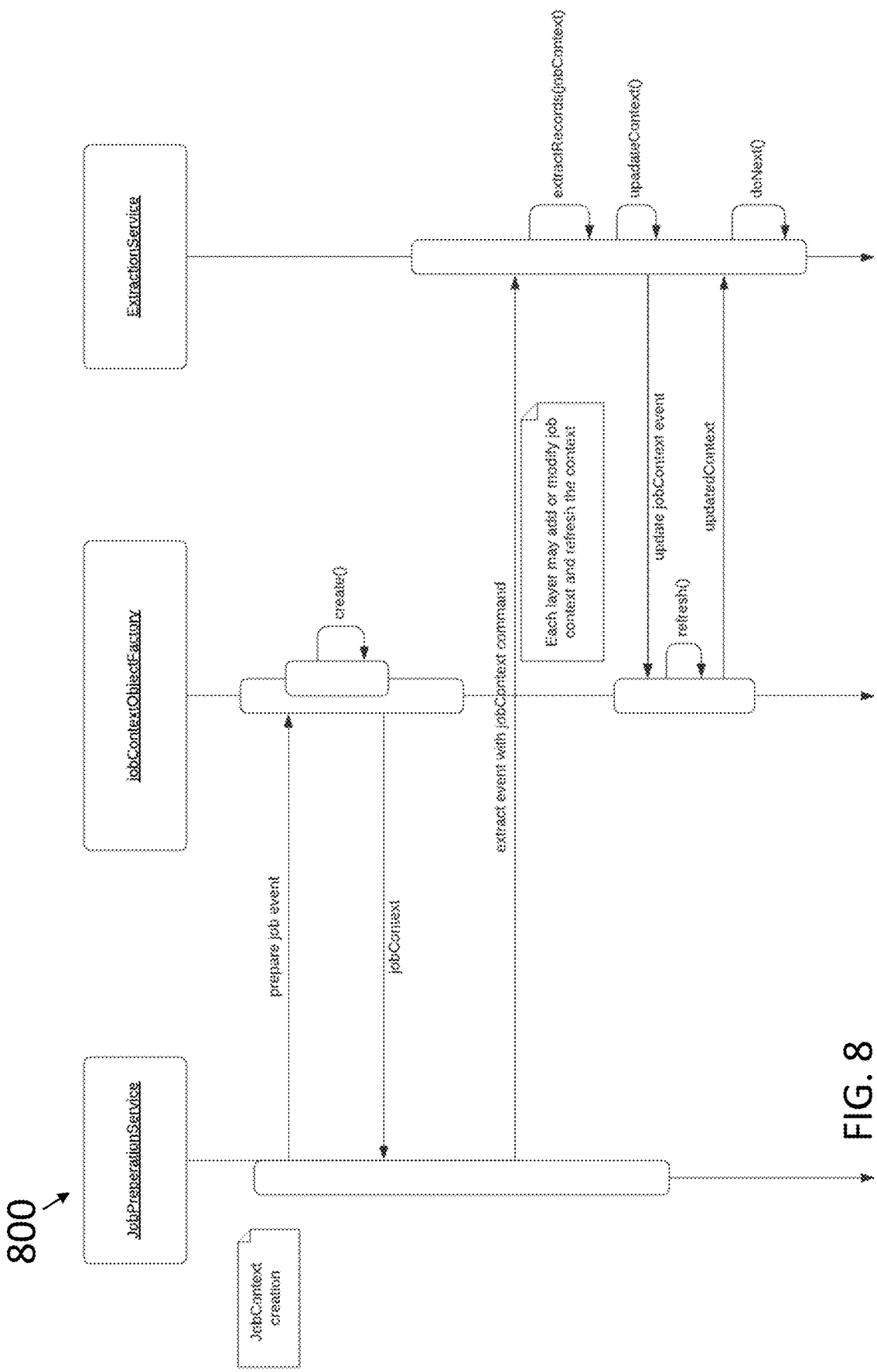
FIG. 8 illustrates an example process flow within the job context creation block within the preparation layer of FIG. 4A, according to some embodiments.

FIG. 8 illustrates an example process flow 800 within the job context creation block within the preparation layer of FIG. 4A, according to some embodiments.

Execution (Synchronous or Asynchronous) Examples

In some embodiments, synchronous and asynchronous execution are distinguished by the way they process data. Both approaches improve over conventional approaches in their own respects as discussed below.

Synchronous Example

In some embodiments, in synchronous setup, the records are read from the source database by Debezium engine and are notified to the next consumer in the pipeline. Debezium engine waits for all the consumers in the pipeline to finish processing before reading the next source record, making the flow synchronous.

In some embodiments, a synchronous approach may have improvements over conventional approaches. For example, a synchronous approach may ensure that no data record is missed in case of failure at any consumer in the pipeline. A synchronous setup may be well suited for small datasets. A read-transform-load may not be parallelized to retain the synchronous nature. It should also be appreciated that it may be time consuming in case of a large dataset with mostly unrelated data, and it may need to restart afresh in case of failure.

Asynchronous Example

In some embodiments, in async setup, the debezium engine and other producers are decoupled from their consumers. This can be achieved by event sourcing. The connector reads each record and sends an application event to the next consumer (ex transform consumer) that handles the event and decides to either mark the record processed or send a new event for the next consumer (ex mongo sink consumer) in the pipeline. The events will carry immutable JobContext and source record and mutable target record.

In some embodiments, an asynchronous approach may have improvements over conventional approaches. For example, an async approach may be better performant in case of large datasets with mostly unrelated data. It may be highly flexible as each component can work independent of each other, for instance the connector can read all the records, send events per record and free the resources when its job is done. Further, certain types of records can be processed in parallel. Async execution may resume from the point of failure, e.g., if the connector has read some records and transformer or sink fails, the records can be stored in a kafka simulating data structure (using rocksdb/redis/tape/kafka), rather than reading from beginning.

Transformation Example

In some embodiments, the execution of rules in the transformation layer can be implemented based on the 'chain of responsibility pattern'. The chain-of-responsibility pattern is a design pattern consisting of a source of command object and a series of processing events. Each processing event is handled by the event handler that contains the action to perform on the source command. Upon receiving an event, the handler decides whether to process the request and then passes it to the next handler in the chain.

Figure 9:
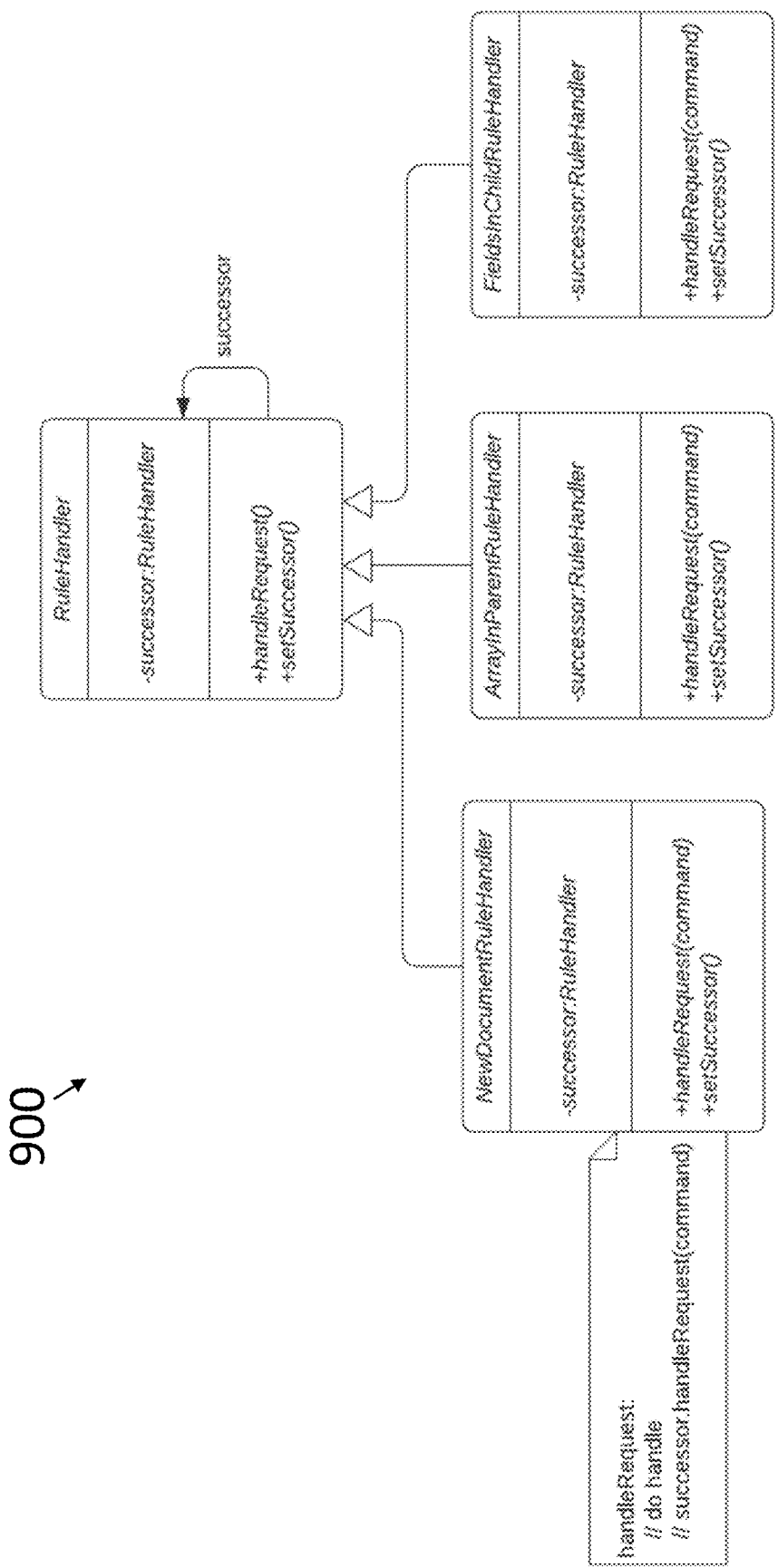
FIG. 9 illustrates an example process flow for applying transformation rules within a transformation layer, according to some embodiments.

FIG. 9 illustrates an example process flow 900 for applying transformation rules within the transformation layer, according to some embodiments.

For example: Rule Identification event

Sample DSL

```
context:
  error: string
  settings:
    id: string
    name: string
    casing: CAMEL_CASE
    keyHandling: GENERATED
  collections:
    [COLLECTION_CUSTOMER]:
      name: customer
    [COLLECTION_PRODUCT]:
      name: product
  mappings:
    [MAPPING_CUSTOMER]:
      settings:
        type: NEW_DOCUMENT
```

```
    notes: Customer collection as new document
    mappingPath: ROOT
  fields:
     [FIELD_CUSTOMER_NAME]:
        name: customerName
        included: true
        type: string
  collectionId: COLLECTION_CUSTOMER
  table: database.schema.Customer
[MAPPING_ORDER]:
  settings:
     type: EMBEDDED_DOCUMENT_ARRAY
     notes: Order details as array of embedded document in customer document
     mappingPath: customer.orders
  fields:
     [FIELD_ORDER_ID]:
        name: orderDescription
        included: true
        type: string
     [FIELD_ORDER_DESCRIPTION]:
        name: orderDescription
        included: true
        type: string
     [FIELD_ORDER_DATE]:
        name: orderDate
        included: true
        type: date
     [FIELD_TOTAL_AMOUNT]:
        name: totalAmount
        included: true
        type: number
  collectionId: COLLECTION_CUSTOMER
  table: database.schema.Orders
[MAPPING_LINE_ITEMS]:
  settings:
     type: EMBEDDED_DOCUMENT_ARRAY
     notes: Order details as array of embedded document in customer.orders
embedded document
     mappingPath: customer.orders.lineItems
  fields:
     [FIELD_ORDER_DESCRIPTION]:
        name: lineItemId
        included: true
        type: string
     [FIELD_QUANTITY]:
        name: quantity
        included: true
        type: number
     [FIELD_UNIT_PRICE]:
        name: unitPrice
        included: true
        type: number
     [FIELD_SUB_TOTAL]:
        name: subTotal
        included: true
        type: number
  collectionId: COLLECTION_CUSTOMER
  table: database.schema.LineItems
[MAPPING_PRODUCT_IN_CHILD]:
  settings:
     type: FIELD_IN_CHILD_DOCUMENT
     notes: Product details in customer.orders.lineItems embedded document
     mappingPath: customer.orders.lineItems
  fields:
     [FIELD_PRODUCT_ID]:
        name: productId
        included: true
        type: string
     [FIELD_PRODUCT_NAME]:
        name: productName
        included: true
        type: string
  collectionId: COLLECTION_CUSTOMER
  table: database.schema.Product
[MAPPING_PRODUCT]
  settings:
     type: NEW_DOCUMENT
     notes: Product collection as new document
     mappingPath: ROOT
```

-continued

```
fields:
   [FIELD_PRODUCT_ID]:
      name: productId
      included: true
      type: string
   [FIELD_PRODUCT_NAME]:
      name: productName
      included: true
      type: string
   [FIELD_CURRENT_PRICE]:
      name: currentPrice
      included: true
      type: number
collectionId: COLLECTION_CUSTOMER
table: database.schema.Product
relationships:
 tables:
  database.schema.Customer:
    mappings: MAPPING_CUSTOMER
  database.schema.Order:
    mappings: MAPPING_ORDER
  database.schema.LineItems:
    mappings: MAPPING_LINE_ITEMS
  database.schema.Products:
    mappings: MAPPING_PRODUCT
 collections:
  COLLECTION_CUSTOMER:
    mappings: [MAPPING_CUSTOMER, MAPPING_ORDER, MAPPING_LINE_ITEMS]
  COLLECTION_PRODUCT:
    mappings: [MAPPING_PRODUCT]
 mappings:
  [MAPPING_CUSTOMER]:
    children: [MAPPING_ORDER]
  [MAPPING_ORDER]:
    children: [MAPPING_LINE_ITEMS]
  [MAPPING_LINE_ITEMS]:
    children: [MAPPING_PRODUCT_IN_CHILD]
  [MAPPING_PRODUCT]:
    children: null
  [MAPPING_PRODUCT_IN_CHILD]:
    children: null
```

Figure 10:
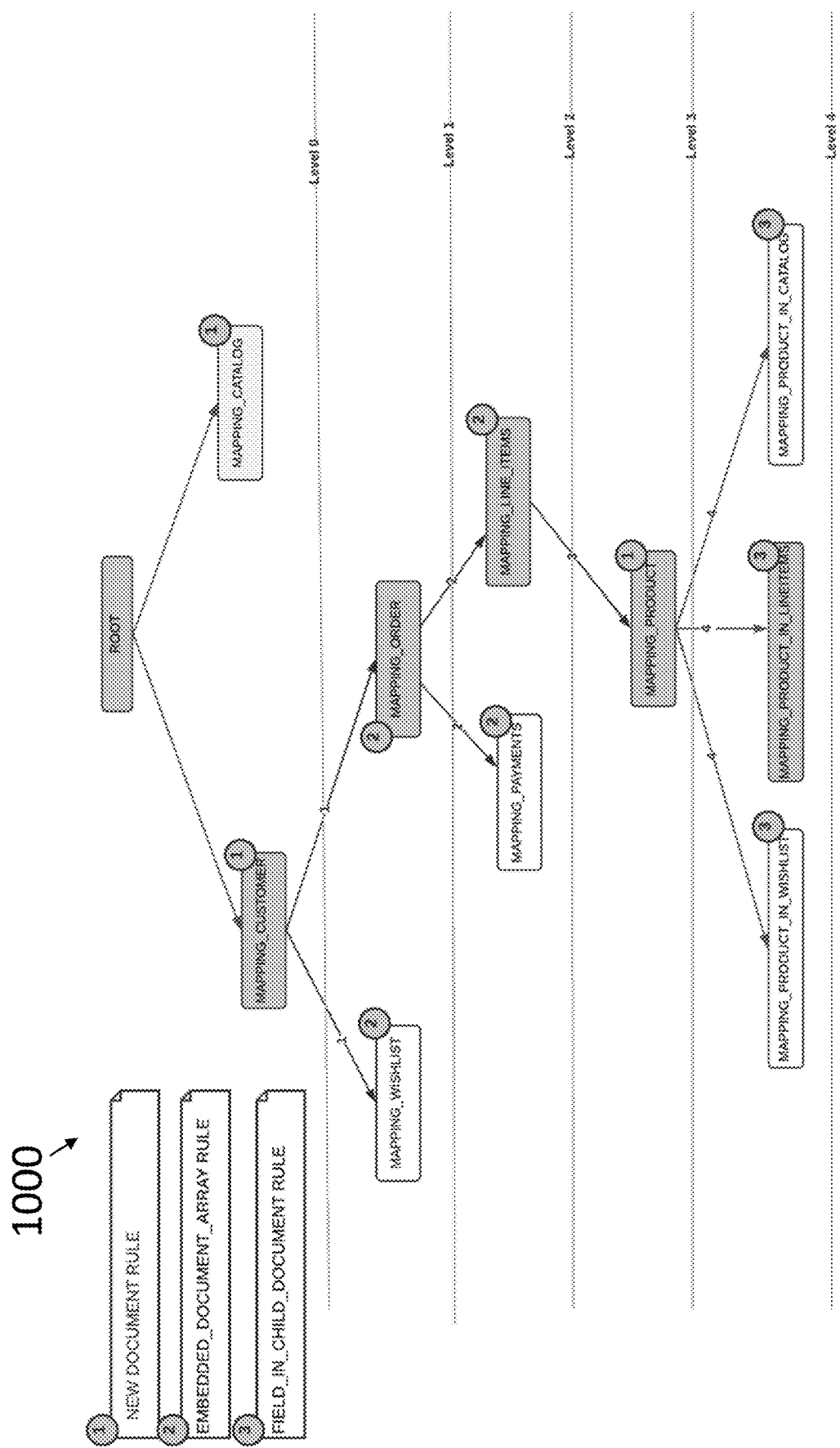
FIG. 10 illustrates a dependency graph and traversal using one-time replication according to an example process flow, according to some embodiments.

FIG. 10 illustrates a dependency graph 1000 and traversal using one-time replication according to the above example process flow, according to some embodiments. In some embodiments, the above example may form the graph of dependencies in FIG. 10 and traverse from the root node in case of one-time replication.

| MAPPING RULES | SOURCE TABLE | TARGET COLLECTION | TRANSFORM ACTIONS |
|---|---|---|---|
| MAPPING_CUSTOMER (NEW DOCUMENT RULE) | CUSTOMER (select [selected columns] from customer) | Customer | db.Customer.insertOne({ customer_id: 123456, full_name: ... }) |
| MAPPING_ORDER (ARRAY IN PARENT RULE) | ORDERS (select customer_id, [selected columns] from orders) | Customer | db.Customer.updateOne({ customer_id: 123456 }, { orders:{ $push: {id:589, ...} } }) |
| MAPPING_LINE_ITEMS (ARRAY IN PARENT RULE) | LINE_ITEMS (select order_id, [ selected columns] from line_items) | Customer | db.Customer.updateOne({ orders.id=589 }, { $push: { orders.$.lineItems: { id:12...} ] }) |
| MAPPING_PRODUCT (NEW DOCUMENT RULE) && MAPPING PRODUCT_IN_CHILD (FIELD IN CHILD DOCUMENT RULE) | PRODUCT (select [selected columns] from product) | Product, Customer | db.Product.insertOne({ product_id: 123456, product_name: ... }) db.Customer.updateOne({ orders.lineItems.id=12 }, { $set: { orders.$.lineItems: { product_name, ...} }) |

Migration Verification

Motivation for Example

Some techniques described herein may be configured to verify whether source data has been migrated without data loss or duplication (e.g. using keys).

Example Solutions

Solution 1: Perform Backcheck with Static Source Database

In some embodiments, when verifying the migrated data in the target database, one approach is to compare with the source database. This approach may assume that the source database can be made immutable during the migration such that the underlying data does not change at least between migration and subsequent verification.

This proposed approach may be performed as follows. For each collection that has completed, all related mappings may be obtained. Next, a batch of documents from the collection may be obtained. Next, for each mapping, the source (e.g., SQL) database may be queried for relevant rows. Next, the two batches may be compared. Next, errors may be written to the destination database system (e.g., MongoDB) and results may be returned via API (e.g., REST). Next, a relational migrator may read from the collection containing errors and expose it via API (e.g., REST endpoint).

In some embodiments, all errors can be aggregated at the document level to keep things simple. In some cases, one can rely just on subdocument counts for arrays, based on the assumption that no data will be lost (via Kafka Connect guarantees)

In some embodiments, this approach may be executed in standalone mode in another thread alongside the main pipeline.

Implementation Example

In some embodiments, this approach may be implemented as follows. A source database (e.g., SQL) query engine may be implemented that outputs the correct query. For new documents, a simple select may be output to make sure they exist. For embedded documents, a simple select may be output to make sure they exist. For embedded documents in an array, (nested) joins may be output.

In some embodiments, a paginated destination database (e.g., MongoDB) collection scanner may be implemented. The scanner may return deterministic results and may be able to resume where it left off in case it dies midway.

In some embodiments, the ability may be implemented to push the most recent verification offset for each collection, in addition to which collections have completed verification.

In some embodiments, a service may be implemented that works out each mapping corresponding to the collection, retrieves the next collection batch from the paginated collection scanner, runs the source database (e.g., SQL) query retrieved from the source database query engine, compares the two and requests an offset update to the most recent verification update.

In some embodiments, the ability may be implemented to push errors to the destination database (e.g., MongoDB). An endpoint may be exposed that displays errors saved to the destination database (e.g., MongoDB). This approach may, in some cases, run alongside relational migration.

Example Monte Carlo Simulation Results data = runSimulations([['One-Time Replication', 20, 17], ['Replication Transformation', 48, 25], ['Kafka Integrated Sync Server', 32, 40], ['Diagramming', 24, 32]], [['Validation', 16],])

Estimated Total: 16
Min: 8.33 (52.06% of estimated)
Max: 21.33 (133.31% of estimated)
[8.33, 25319], [13.6, 24883], [20.0, 24856], [21.33, 24942]]

In some embodiments, rather than having more than one process verify the same collection at the same time, one can have multiple processes each verifying a separate collection.

Example Solution 2: Backcheck without Static Source Database

In some embodiments, a source database may not be immutable and the assumption of Example Solution 1 is incorrect. In that case, one may instead consider that when the target database is verified, it may be slightly out of sync from the source database, and one may check back on any discrepancies after verification has identified them.

In some embodiments, the proposed approach will go as follows (e.g., using CDC). Continuously run the backcheck verification from the previous solution and save missing records. Missing records may include records that are present in source but not in target and records that are present in target but not in source.

In some embodiments, each discrepancy will have a grace period, where as long as discrepancy exists within the grace period it will not be counted as an error. The grace period will not start until CDC has commenced as the two databases need to be almost in sync. In some embodiments, if the discrepancy still exists after the grace period, the user can be notified.

In some cases, the number of subdocuments in arrays may be counted, but in other cases such as where rows can be added/removed from the source database, it may become difficult to track whether the discrepancy has been resolved without looking at each subdocument.

Implementation Example

In some embodiments, this approach may be implemented as follows. Indexing may be added to failed documents collection to make them query-able and updateable and deletable. Ability may be added to scan through documents in grace period and check if they have exceeded their grace period. Ability may be added to move records from 'grace period' collection to 'failed' collection. Ability may be added to select the wait time between each verification cycle via the job endpoint, and actually use the specified time.

Example Solution 3: Incremental Queries on Target Database

In some embodiments, rather than or in addition to using the source database for verification, an approach may use what's stored in Kafka as the source of truth.

In some embodiments, this proposed approach may be performed as follows. Starting with the first topic in the ordered list of topics, delay until it has been fully consumed by relational migration. Then, iterate over each mapping type and query them in the destination database (e.g., MongoDB). If they are new documents, simply check that they exist. If they are embedded documents, check that they exist and are attached to the correct parent document. If they are embedded documents in an array, query for the parent document and verify that the child exists.

In some embodiments, because Kafka may be used in this approach, the verification may be scaled as desired, as long as the records have been consumed by relational migration.

In some embodiments, this approach may be executed in Standalone mode in another thread alongside the main pipeline, and/or in distributed mode as a Kafka connector Overview of Detailed Design Example In some embodiments, migration verification may include comparing the target database directly with the source database, such as using SQL SELECT statements for a relational source database. Some embodiments will use a completed relational migration before verification process takes place, whereas other embodiments will at least partially parallelize the two.

In some embodiments, all states around the verification, such as verification offset and errors will be stored in the destination database (e.g., MongoDB, similar to the verification progress in _migrationJobs collection), and will be consumed when the verification status is requested.

Detailed Design Example

Deployment Model Example

In some embodiments, the verification service may primarily be in the form of an external microservice. One rationale behind this is that the verification service may have almost no overlapping logic with migration logic, and can run without knowing the existence of anything but the source and target database. Furthermore, by having the verification logic live in a separate service, it may be scaled independent of everything else. Scaling can take place both vertically and horizontally, with or without parallelisation.

In some embodiments, similar to a web application for relational migration, an executable and/or a docker image may be used depending on the use case.

In some embodiments, an embedded architecture can directly import the service layer functions of the verification logic, and run the verification job in a separate thread.

Example Implementation Details

Example API Design

In some embodiments, the verification service will expose the following three endpoints:

[POST]/verification
[GET]/verification/{migrationJobId}
[POST]/verification/{migrationJobId}/stop In some embodiments, the first endpoint will start the verification process. The verification service will need to know the shape of each collection in order to create the correct source database (e.g., SQL) queries, alongside the connection details for the destination database and the transformation rules. The current migrationJobDescriptor and connection details objects used for kicking off a migration job can be reused for this purpose. In some embodiments, reusing the migrationJobDescriptor and connection details objects may beneficially leverage an existing Open API definition, and the objects may contains all the information required to perform the verification. Plus, the frontend may already have the payload prepared.

In some embodiments, using the migrationJobDescriptor, a directed acyclic graph (DAG) of table dependencies may be created, which can be used later for source database (e.g., SQL) query generation.

In some embodiments, once the endpoint has been invoked, it will perform a preliminary check to make sure the migration job is visible in the destination (e.g., MongoDB) database and return 200 OK.

In some embodiments, the second endpoint will return a progress report for the verification process.

```
{
    "migrationJobId": "abcd",
    "status": "RUNNING",
    "startedAt": "2022-08-01T06:17:37.139Z",
    "lastUpdatedAt": "2022-08-01T06:17:37.139Z",
    "progress": [
        {
            "collection": "collectionA",
            "verifiedCount": 123,
            "errorCount": 123,
            "completed": true
        },
        {
            "collection": "collectionB",
            "verifiedCount": 123,
            "errorCount": 123,
            "completed": false
        }
    ]
}
```

In some embodiments, the last endpoint will simply take the jobId and terminate the verification process for that job.

Example Implementation Design

This section outlines example classes and their relationships.

Figure 11:
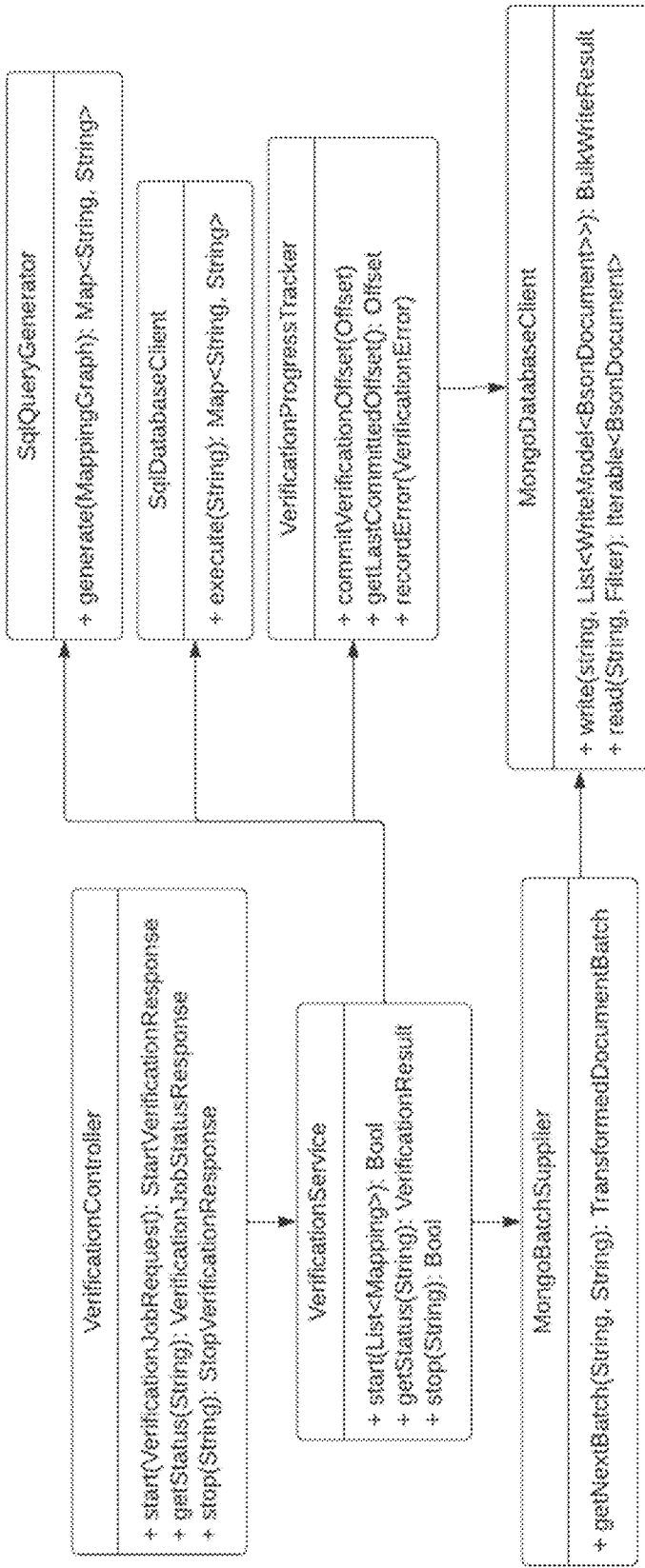
FIG. 11 illustrates an example process flow of migration verification components described herein, in accordance with some embodiments.

FIG. 11 illustrates an example process flow 1100 of migration verification components described herein, in accordance with some embodiments.

VerificationController

In some embodiments, this class is responsible for all incoming HTTP requests. Interfaces are explained in detail above.

VerificationService

In some embodiments, this class is responsible for actually verifying the data. After it receives the request for starting the verification, it will run the verification in another thread and return immediately. To keep the implementation simple, the verification job will require the migration to have completed, and will fail gracefully if it detects an unfinished migration.

In some embodiments, this class will request data from both source (e.g., SQL) and destination (e.g., MongoDB) databases, and compare the contents. Batches from destination database (e.g., MongoDB) will be queried sequentially for each collection, and the original primary keys contained in the batches will be appended to the end of the generated source database (e.g., SQL) queries in the form of ---
WHERE root_table.pk IN (<list of primary keys>),
--- where root_table is the table that corresponds to the root document. Once the batch is verified, it will commit the offset (document ID) and record any errors encountered.

In some embodiments, the VerificationService should also be able to resume where it left off in case of unexpected shutdowns using the VerificationProgressTracker. The start method will always resume a pre-existing verification as long as the same job ID is given.

MongoBatchSupplier

In some embodiments, this class is for sending paginated requests to the MongoDB client, and transforming the result to only what's necessary for verification. This means it should aggregate data where it needs to.

In some embodiments, the next page in a collection can be extracted using:

db.collection.find({'_id':{'$gt':last_id}}).limit(limit)

In some embodiments, the above operation will always give a deterministic order of the documents, and query will be optimised as the _id field is only being used to retrieve the next batch.

SqlQueryGenerator

In some embodiments, this class is responsible for generating a list of source database (e.g., SQL) queries required to extract data from the source (e.g., SQL) database, given the mapping rules. Each source database (e.g., SQL) query should aim to collect all information required for a given destination database grouping (e.g., MongoDB collection of documents).

VerificationProgressTracker

In some embodiments, this class is responsible for handling all requests related to the progress of the verification by referring to information stored in destination database (e.g., MongoDB).

Algorithm Design: SQL Query Generation

Figure 12:
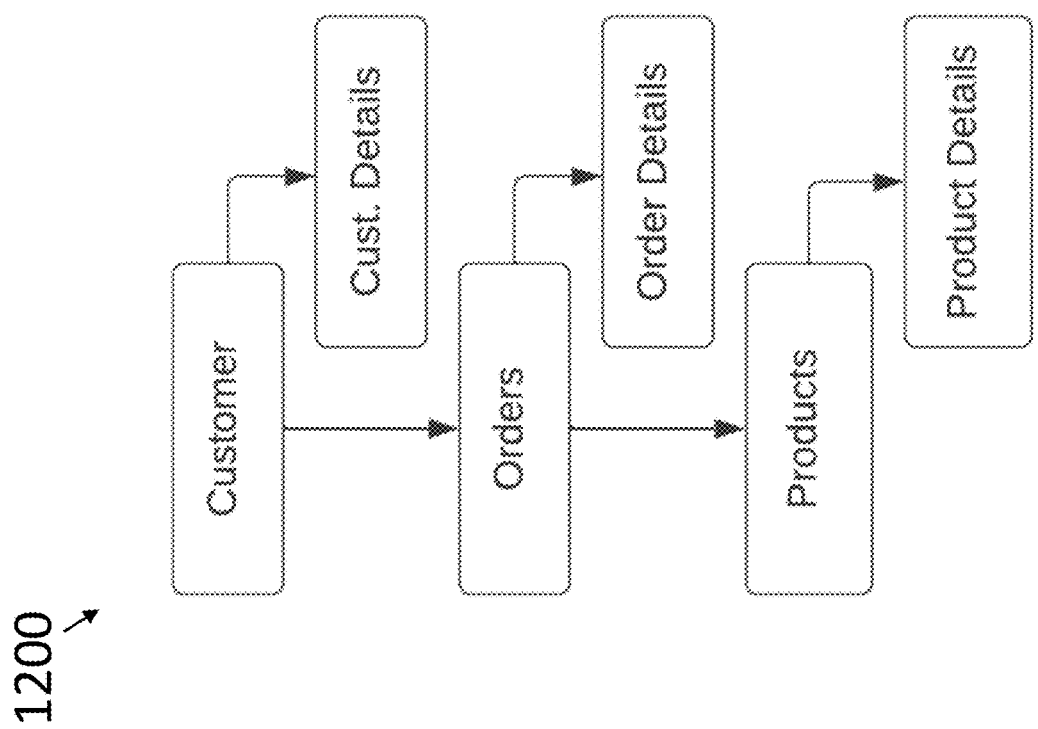
FIG. 12 illustrates an example mapping graph that may be constructed using edges from a request payload, according to some embodiments.

In some embodiments, when performing verification, fewer calls to the source (e.g., SQL) database may be used to increase verification speed. Below is an example MongoDB document exemplifying this principle. FIG. 12 illustrates an example mapping graph 1200 that may be constructed using the edges from the request payload, according to some embodiments.

---
```
{
  "customerId": 123,
  "customerDetails": {
    "key": "value"
  },
  "orders": [
    {
      "orderId": 123,
      "orderDetails": {
        "key": "value"
      },
      "products": [
        {
          "productId": 123,
          "productDetails": {
            "key": "value"
          }
        }
      ]
    }
  ]
}
```
---

In some embodiments, the above example may need the existence of customer details, the order ID associated with each customer, the order details ID of each order. the product ID associated with each order, and the product details ID of each product.

In some embodiments, the approach discussed here will use depth-first-search to traverse down the tree, and create a source database (e.g., SQL) statement that will retrieve all paths to all subdocuments in the result document.

First, two arrays may be created: one for keeping track of the column selections and one for keeping track of the joins to be performed.

---
Starting at the root of the tree:
(Let curr=current_table, subtree=subtree_table):
First, if current table is the root:
   Add the following to the column selection array:
    'SELECT {curr.name}.{curr.pk} as "{curr.name}"'
   Add the following to the join array:
    FROM {curr.name}'
Else, add the following to the column selection array:
   '{curr.name}.{curr.pk} as "{curr.name}"'
Then, for each subtree:
   Add the following to the join array:
    'LEFT JOIN {subtree.name} ON {curr.name}.{curr.pk} = {subtree.name}.{subtree.fk}'
   Recurse to subtree
---

In some embodiments, the above algorithm may produce the following arrays:

[
  "customer.id as customer",
  "customer_details.id as customer_details",
  "orders.id as orders",

```
"order_details.id, order_details",
"products.id as products",
"product_details.id as product_details"
]
[
"FROM customer",
"LEFT JOIN customer_details ON customer.id = customer_details.customer",
"LEFT JOIN orders ON customer.id = orders.customer",
"LEFT JOIN order_details ON order.id = order_details.order",
"LEFT JOIN products ON orders.id = products.order",
"LEFT JOIN product_details ON products.id = product_details.product"
]
```

Then, the two arrays may be concatenated like so:

```
{for each column_selection in column_selection_array, separated by comma} { for each join in
join_array, separated by comma} WHERE {root.name} {root.id} = {some_ID}
```

In some embodiments, since this select statement will return all paths to all subdocuments, the data may be aggregated to remove redundancies. To do this, construct an N-ary tree using the paths from each row.

In some embodiments, each node should have a set as the children as this will avoid duplicate relationships. At this point, the tree should be equivalent to the document from MongoDB, making it possible to compare them side by side.

Errors & Progress Storage

In some embodiments, all errors found during the verification will be stored in the _verificationJobs collection. Verification progress and errors are separated into their respective collections to be easily consumed later. Below is what an example document in the _verificationJobs collection:

```
{
    "_id": "2f80ff9affa4485fa89861fed6012b10",
    "createdDate": "2022-07-27T02:30:56.521+00:00",
    "modifiedDate": "2022-07-27T02:33:02.012+00:00",
    "verification": {
        "collection1": {
            "offset": "abc",
            "errorCount": 123,
            "completed": false,
            "collectionErrors": [
                {
                    "_id": "abc",
                    "errors": [
                        {
                            "path": "orders[1].details"
                            "message": "Missing subdocument [X]"
                        }
                    ]
                }
                ...
            ]
        }
        ...
    }
}
```

Example Design Alternatives

An alternative solution may build on top of the above solution, in which the verification will run continuously. Each discrepancy is given a grace period, and when the verifier encounters the same discrepancy again after exceeding the grace period, it will officially record that as an error. The continuous verification job may use CDC.

Example Test Plan

For testing, one can leverage smoke tests. The smoke tests may compare the newly migrated database to a pre-existing "expected" database. One can add the verification step on top of this to verify that the same result is obtained.

In addition to the test above, one may also benefit from having another pre-existing database with a set number of errors and have the test make sure the verification service returns the correct number of errors.

Smoke tests should run the verification service in embedded mode to reduce complexity, and one can have one end-to-end test that runs the verification service as a separate service in some cases.

Example Special-Purpose Computer System

A special-purpose computer system can be specially configured as disclosed herein. According to one embodiment the special-purpose computer system is configured to perform any of the described operations and/or algorithms. The operations and/or algorithms described herein can also be encoded as software executing on hardware that defines a processing component, that can define portions of a special purpose computer, reside on an individual special-purpose computer, and/or reside on multiple special-purpose computers.

Figure 13:
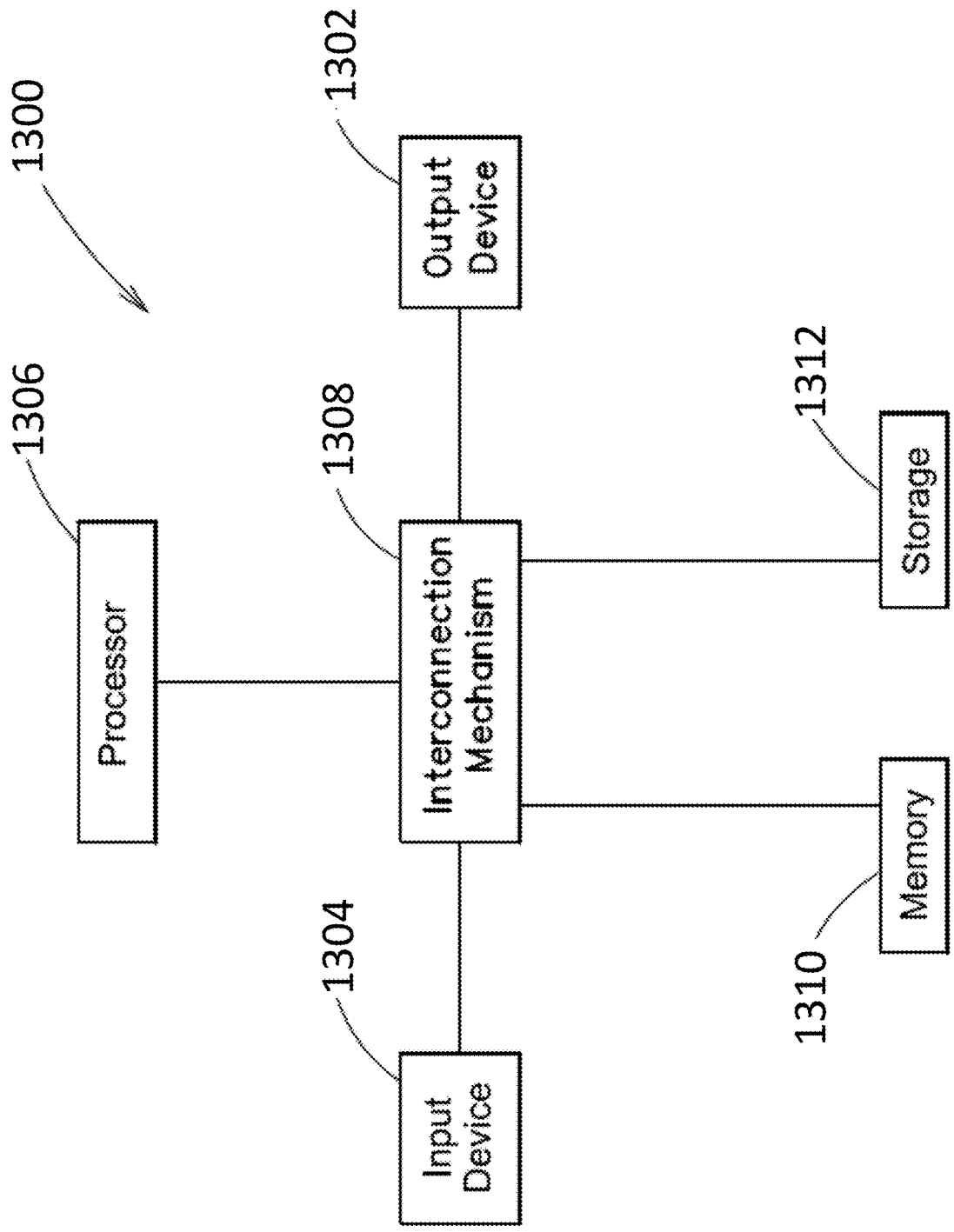
FIG. 13 illustrates a block diagram of an example special-purpose computer system on which various aspects of the present disclosure can be practiced, according to some embodiments.

FIG. 13 illustrates a block diagram of an example special-purpose computer system 1300 on which various aspects of the present disclosure can be practiced, according to some embodiments. For example, computer system 1300 may include a processor 1306 connected to one or more memory devices 1310, such as a disk drive, memory, or other device for storing data. Memory 1310 is typically used for storing programs and data during operation of the computer system 1300. Components of computer system 1300 can be coupled by an interconnection mechanism 1308, which may include one or more busses (e.g., between components that are integrated within a same machine) and/or a network (e.g., between components that reside on separate discrete machines). The interconnection mechanism enables communications (e.g., data, instructions) to be exchanged between system components of system 1300.

Computer system 1300 may also include one or more input/output (I/O) devices 1302-1304, for example, a keyboard, mouse, trackball, microphone, touch screen, a printing device, display screen, speaker, etc. Storage 1312 typically includes a computer readable and writeable nonvolatile recording medium in which computer executable instructions are stored that define a program to be executed by the processor or information stored on or in the medium to be processed by the program.

The medium can, for example, be a disk or flash memory. Typically, in operation, the processor causes data to be read from the nonvolatile recording medium into another memory that allows for faster access to the information by the processor than does the medium. This other memory is typically a volatile, random-access memory such as a dynamic random-access memory (DRAM) or static memory (SRAM). According to one embodiment, the computer-readable medium comprises a non-transient storage medium on which computer executable instructions are retained.

Referring again to FIG. 13, the memory can be located in storage 1312 as shown, or in a memory system. The processor 1306 generally manipulates the data within the memory 1310, and then copies the data to the medium associated with storage 1312 after processing is completed. A variety of mechanisms are known for managing data movement between the medium and integrated circuit memory element and the present disclosure is not limited thereto. The present disclosure is not limited to a particular memory system or storage system.

The computer system may include specially-programmed, special-purpose hardware, for example, an application-specific integrated circuit (ASIC). Aspects of the present disclosure can be implemented in software, hardware or firmware, or any combination thereof. Although computer system 1300 is shown by way of example, as one type of computer system upon which various aspects of the present disclosure can be practiced, it should be appreciated that aspects of the present disclosure are not limited to being implemented on the computer system as shown in FIG. 13. Various aspects of the present disclosure can be practiced on one or more computers having a different architectures or components than that shown in FIG. 13.

It should be appreciated that the present disclosure is not limited to executing on any particular system or group of systems. Also, it should be appreciated that the present disclosure is not limited to any particular distributed architecture, network, or communication protocol.

Various embodiments of the present disclosure can be programmed using an object-oriented programming language, such as Java, C++, Ada, or C # (C-Sharp). Other programming languages may also be used. Alternatively, functional, scripting, and/or logical programming languages can be used. Various aspects of the present disclosure can be implemented in a non-programmed environment (e.g., documents created in HTML, XML or other format that, when viewed in a window of a browser program, render aspects of a graphical-user interface (GUI) or perform other functions). The system libraries of the programming languages are incorporated herein by reference. Various aspects of the present disclosure can be implemented as programmed or non-programmed elements, or any combination thereof.

A distributed system according to various aspects may include one or more specially configured special-purpose computer systems distributed among a network such as, for example, the Internet. Such systems may cooperate to perform functions related to hosting a partitioned database, managing database metadata, monitoring distribution of database partitions, monitoring size of partitions, splitting partitions as necessary, migrating partitions as necessary, identifying sequentially keyed collections, optimizing migration, splitting, and rebalancing for collections with sequential keying architectures.

Further Aspects

Some aspects provide a method, comprising receiving, by a computer system, a migration request to migrate source data from a first database to a second database, wherein the source data in the first database comprises a first portion having a first schema; the second database comprises a second portion having a second schema; and the migration request comprises at least one rule specifying a logical arrangement under the second schema to which a grouping of source data in the first portion under the first schema is to be transformed. The method further comprises transforming, by the computer system, the source data from the first schema to the second schema to generate transformed source data at least in part by transforming the grouping of source data in the first portion under the first schema to generate at least one grouping of transformed source data in the specified logical arrangement under the second schema according to the at least one rule. The method further comprises storing, by the computer system, the transformed source data in the second portion of the second database under the second schema with the at least one grouping of transformed source data having the specified logical arrangement.

In some embodiments, the second portion of the second database is unstructured and the first schema is relational.

In some embodiments, the at least one rule comprises a first rule selected by a user from among at least first and second rules in response to at least the first and second rules being presented to the user for selection via a graphical user interface (GUI).

In some embodiments, the at least one rule specifies whether to transform a base-level data structure of the grouping of source data to generate a new corresponding base-level data structure of the transformed source data and/or to generate one or more new fields within an existing base-level data structure of the transformed source data.

In some embodiments, the one or more new fields comprise an array within the existing base-level data structure. In some embodiments, the method further comprises, by the computer system presenting a graphical user interface (GUI) to a user to prompt selection, for a particular grouping of base-level data structures in the source data, of an option from among at least generating one or more new corresponding base-level data structures of the transformed source data and/or generating one or more new fields within an existing base-level data structure of the transformed source data, wherein the migration request is generated at least partially in response to the selection.

In some embodiments, the at least one rule specifies whether to transform a row of a table of the first portion of the source data to generate a new corresponding document of the transformed source data and/or to generate one or more new fields within an existing document of the transformed source data.

In some embodiments, the method further comprises, by the computer system, presenting a graphical user interface (GUI) to a user to prompt selection, for a particular table in the source data, of an option from among at least generating one or more new corresponding documents of the transformed source data and/or generating one or more new fields within an existing document of the transformed source data, wherein the migration request is generated at least partially in response to the selection.

In some embodiments, the migration request specifies a first address where the source data of the first database is stored and a second address at which the transformed source data is to be stored in the second database.

In some embodiments, the method further comprises generating, by the computer system, based on the migration request, a graph defining an order and/or priority for loading portions of the source data from the first database.

In some embodiments, the graph comprises a dependency graph comprising multiple parallel paths indicating multiple portions of the source data for transforming in parallel and generating the graph comprises identifying a plurality of base portions of the source data corresponding to base collections to be generated in the second database.

In some embodiments, generating the graph further comprises determining, based on the migration request, a plurality of secondary portions to be added and/or linked to the base collections in the second database.

In some embodiments, the at least one rule comprises an indication of which portions of the source data will be transformed, at least in part, into one or more arrays within one or more existing documents in the second database.

Some aspects provide a computer system, comprising at least one processor operatively coupled to memory and configured to receive a migration request to migrate source data from a first database to a second database, wherein the source data in the first database comprises a first portion having a first schema; the second database comprises a second portion having a second schema; and the migration request comprises at least one rule specifying a logical arrangement under the second schema to which a grouping of source data in the first portion under the first schema is to be transformed. The at least one processor is further configured to transform the source data from the first schema to the second schema to generate transformed source data at least in part by transforming the grouping of source data in the first portion under the first schema to generate at least one grouping of transformed source data in the specified logical arrangement under the second schema according to the at least one rule. The at least one processor is further configured to store the transformed source data in the second portion of the second database under the second schema with the at least one grouping of transformed source data having the specified logical arrangement.

In some embodiments, the second portion of the second database is unstructured and the first schema is relational.

In some embodiments, the at least one rule comprises a first rule selected by a user from among at least first and second rules in response to at least the first and second rules being presented to the user for selection via a graphical user interface (GUI).

In some embodiments, the at least one rule specifies whether to transform a base-level data structure of the grouping of source data to generate a new corresponding base-level data structure of the transformed source data and/or to generate one or more new fields within an existing base-level data structure of the transformed source data.

In some embodiments, the one or more new fields comprise an array within the existing base-level data structure.

In some embodiments, the at least one processor is further configured to present a graphical user interface (GUI) to a user to prompt selection, for a particular grouping of base-level data structures in the source data, of an option from among at least generating one or more new corresponding base-level data structures of the transformed source data and/or generating one or more new fields within an existing base-level data structure of the transformed source data, wherein the migration request is generated at least partially in response to the selection.

In some embodiments, the at least one rule specifies whether to transform a row of a table of the first portion of the source data to generate a new corresponding document of the transformed source data and/or to generate one or more new fields within an existing document of the transformed source data.

In some embodiments, the at least one processor is further configured to present a graphical user interface (GUI) to a user to prompt selection, for a particular table in the source data, of an option from among at least generating one or more new corresponding documents of the transformed source data and/or generating one or more new fields within an existing document of the transformed source data, wherein the migration request is generated at least partially in response to the selection.

In some embodiments, the migration request specifies a first address where the source data of the first database is stored and a second address at which the transformed source data is to be stored in the second database.

In some embodiments, the at least one processor is further configured to generate, based on the migration request, a graph defining an order and/or priority for loading portions of the source data from the first database.

In some embodiments, the graph comprises a dependency graph comprising multiple parallel paths indicating multiple portions of the source data for transforming in parallel and the at least one processor is configured to generate the graph at least in part by identifying a plurality of base portions of the source data corresponding to base collections to be generated in the second database.

In some embodiments, the at least one processor is further configured to generate the graph at least in part by determining, based on the migration request, a plurality of secondary portions to be added and/or linked to the base collections in the second database.

In some embodiments, the at least one rule comprises an indication of which portions of the source data will be transformed, at least in part, into one or more arrays within one or more existing documents in the second database.

Having thus described several aspects and embodiments of this disclosure, it is to be appreciated that various alterations, modifications, and improvements will readily occur to those skilled in the art. Such alterations, modifications, and improvements are intended to be part of this disclosure and are intended to be within the spirit and scope of the present disclosure. Accordingly, the foregoing description is by way of example only.

As an alternative or in addition to migrating data from a relational database to a non-relational database, in some embodiments, transformation rules and other techniques described herein may be applicable in other forms of data migration, such as between non-relational databases having different schemas from one another. In some cases, techniques described herein may be useful in transforming data from a first logical arrangement to a second logical arrangement under the same schema, as embodiments described herein are not so limited.

As an alternative or in addition to data migration that may be performed at one time, in some embodiments, data migration may be performed continuously. For example, as a first database is updated, data from the first database may be transformed and stored in a second database according to a newly and/or previously specified transformation rule.

As an alternative or in addition to user specification of transformation rules, in some embodiments, selection of appropriate transformation rules may be at least partially automated. As one example, user specification of base groupings (e.g., tables) and/or links (e.g., primary keys) may be sufficient for automated transformation rules to designate which base-level data structures and/or groupings thereof are to transformed into new base-level data structures and/or fields within existing base-level data structures.

Use of ordinal terms such as "first," "second," "third," "a," "b," "c," etc., in the claims to modify or otherwise identify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The invention claimed is:

1. A method, comprising:
receiving, by a computer system, a migration request to migrate source data from a first database to a second database, wherein:
the source data in the first database comprises a first portion having a first schema;
the second database comprises a second portion having a second schema; and
the migration request identifies a first grouping and a second grouping of the source data in the first portion of the first database wherein the first and second groupings reference one another;
transforming, by the computer system, the source data from the first schema to the second schema to generate transformed source data at least in part by transforming the first grouping of the source data and the second grouping of the source data under the first schema to generate a third grouping of transformed source data and a fourth grouping of transformed source data under the second schema, wherein:
the third grouping comprises base-level data structures corresponding to base-level data structures of the first grouping; and
the fourth grouping comprises base-level data structures corresponding to base-level data structures of the first grouping and of the second grouping; and
storing, by the computer system, the transformed source data in the second portion of the second database under the second schema including the third grouping and the fourth grouping.

2. The method of claim 1, wherein the first grouping and the second grouping have references that permit joining the first grouping and the second grouping during a data access operation under the first schema.

3. The method of claim 2, wherein:
the first grouping is a first table having a primary key;
the second grouping is a second table having a primary key;
the first table references the primary key of the second table; and
the second table references the primary key of the first table.

4. The method of claim 1, wherein transforming the second grouping comprises:
generating a cache having base-level data structures corresponding to the base-level data structures of the first grouping; and
moving and/or copying at least some of the base-level data structures of the cache to the fourth grouping.

5. The method of claim 4, wherein the at least some of the base-level data structures of the cache comprise base-level data structures for which the fourth grouping does not have corresponding base-level data structures from the second grouping.

6. The method of claim 5, wherein:
the base-level data structures of the first grouping and of the second grouping comprise table rows; and
the base-level data structures of the third grouping, of the fourth grouping, and of the cache comprise documents.

7. The method of claim 1, wherein references in the first grouping and in the second grouping to one another are specified by a user as input to a graphical user interface (GUI).

8. The method of claim 1, wherein the first schema is relational and the second portion of the second database is unstructured and/or non-relational.

9. The method of claim 1, further comprising generating, by the computer system, based on the migration request, a graph defining an order and/or priority for loading portions of the source data from the first database.

10. The method of claim 9, wherein the graph comprises a dependency graph comprising multiple parallel paths indicating multiple portions of the source data for transforming in parallel.

11. A computer system, comprising:
at least one processor operatively coupled to memory and configured to:
receive a migration request to migrate source data from a first database to a second database, wherein:
the source data in the first database comprises a first portion having a first schema;
the second database comprises a second portion having a second schema; and
the migration request identifies a first grouping and a second grouping of the source data in the first portion of the first database wherein the first and second groupings reference one another;
transform the source data from the first schema to the second schema to generate transformed source data at least in part by transforming the first grouping of the source data and the second grouping of the source data under the first schema to generate a third grouping of transformed source data and a fourth grouping of transformed source data under the second schema, wherein:
the third grouping comprises base-level data structures corresponding to base-level data structures of the first grouping; and
the fourth grouping comprises base-level data structures corresponding to base-level data structures of the first grouping and of the second grouping; and
store the transformed source data in the second portion of the second database under the second schema including the third grouping and the fourth grouping.

12. The computer system of claim 11, wherein the first grouping and the second grouping have references that permit joining the first grouping and the second grouping during a data access operation under the first schema.

13. The computer system of claim 12, wherein:
the first grouping is a first table having a primary key;
the second grouping is a second table having a primary key;
the first table references the primary key of the second table; and
the second table references the primary key of the first table.

14. The computer system of claim 11, wherein the at least one processor is configured to transform the second grouping at least in part by:
generating a cache having base-level data structures corresponding to the base-level data structures of the first grouping; and
moving and/or copying at least some of the base-level data structures of the cache to the fourth grouping.

15. The computer system of claim 14, wherein the at least some of the base-level data structures of the cache comprise base-level data structures for which the fourth grouping does not have corresponding base-level data structures from the second grouping.

16. The computer system of claim 15, wherein:
the base-level data structures of the first grouping and of the second grouping comprise table rows; and
the base-level data structures of the third grouping, of the fourth grouping, and of the cache comprise documents.

17. The computer system of claim 11, wherein references in the first grouping and in the second grouping to one another are specified by a user as input to a graphical user interface (GUI).

18. The computer system of claim 11, wherein the first schema is relational and the second portion of the second database is unstructured and/or non-relational.

19. The computer system of claim 11, wherein the at least one processor is further configured to generate, based on the migration request, a graph defining an order and/or priority for loading portions of the source data from the first database.

20. The computer system of claim 19, wherein the graph comprises a dependency graph comprising multiple parallel paths indicating multiple portions of the source data for transforming in parallel.

* * * * *